(12) United States Patent
Walia et al.

(10) Patent No.: US 10,073,830 B2
(45) Date of Patent: Sep. 11, 2018

(54) SYSTEMS, DEVICES, AND METHODS FOR AUTOMATIC DETECTION OF FEELINGS IN TEXT

(71) Applicant: CLUEP INC., Toronto (CA)

(72) Inventors: Karan Walia, Mississauga (CA); Anton Mamonov, Toronto (CA)

(73) Assignee: CLUEP INC., Toronto (CA)

( * ) Notice: Subject to any disclaimer, the term of this patent is extended or adjusted under 35 U.S.C. 154(b) by 145 days.

(21) Appl. No.: 15/109,044

(22) PCT Filed: Jan. 9, 2015

(86) PCT No.: PCT/CA2015/000014
§ 371 (c)(1),
(2) Date: Jun. 29, 2016

(87) PCT Pub. No.: WO2015/103695
PCT Pub. Date: Jul. 16, 2015

(65) Prior Publication Data
US 2016/0321243 A1    Nov. 3, 2016

Related U.S. Application Data

(60) Provisional application No. 61/925,942, filed on Jan. 10, 2014.

(51) Int. Cl.
*G06F 17/27* (2006.01)
*G06F 17/30* (2006.01)

(52) U.S. Cl.
CPC ........ *G06F 17/2765* (2013.01); *G06F 17/271* (2013.01); *G06F 17/274* (2013.01);
(Continued)

(58) Field of Classification Search
CPC .................................................... G06F 17/274
See application file for complete search history.

(56) References Cited

U.S. PATENT DOCUMENTS 6,622,140 B1 * 9/2003 Kantrowitz ....... G06F 17/30707
8,463,594 B2 * 6/2013 Au ......................... G06F 17/27
704/1
(Continued)

FOREIGN PATENT DOCUMENTS

CN      102200969 A    9/2011
CN      103034626 A    4/2013
(Continued)

OTHER PUBLICATIONS

Le and Mikolov, "Distributed Representations of Sentences and Documents," Proceedings of the 31 st International Conference on Machine Learning, Beijing, China, 2014.*
(Continued)

*Primary Examiner* — Forrest F Tzeng
(74) *Attorney, Agent, or Firm* — Norton Rose Fulbright Canada LLP; Niall Cooney

(57) ABSTRACT

Embodiments described herein relate generally to content analysis technologies and natural language processing (NLP). In particular, devices, systems, and methods may implement a reverse sentence reconstruct (RSR) utility, and a sentence vectorization technique (SVT) utility. A computer server may be configured to receive a feeling classification request with text data elements, and in response, generate a feeling classification response indicating feeling for the text data elements using the RSR utility and the SVT utility.

25 Claims, 31 Drawing Sheets

(52) U.S. Cl.
CPC .... *G06F 17/2785* (2013.01); *G06F 17/30625* (2013.01); *G06F 17/30705* (2013.01)

(56) References Cited

U.S. PATENT DOCUMENTS

| | | | |
|---|---|---|---|
| 9,117,446 B2* | 8/2015 | Bao | G10L 13/10 |
| 9,262,688 B1* | 2/2016 | Zadeh | G06N 7/02 |
| 9,298,690 B2* | 3/2016 | Kim | G06F 17/27 |
| 9,606,980 B2* | 3/2017 | Andrejko | G06F 17/2735 |
| 2007/0198530 A1* | 8/2007 | Takahashi | G06F 17/3061 |
| 2008/0249764 A1 | 10/2008 | Huang et al. | |
| 2008/0270116 A1 | 10/2008 | Godbole et al. | |
| 2012/0101870 A1* | 4/2012 | Gates | G06Q 10/0635 705/7.28 |
| 2012/0226627 A1* | 9/2012 | Yang | G06Q 30/018 705/347 |
| 2012/0278064 A1 | 11/2012 | Leary et al. | |

FOREIGN PATENT DOCUMENTS

| | | | |
|---|---|---|---|
| CN | 103678278 | * | 12/2013 |
| CN | 103678278 A | | 3/2014 |
| CN | 106096664 | * | 6/2016 |
| CN | 106096664 | * | 8/2016 |
| JP | 5283288 B2 | | 11/2013 |

OTHER PUBLICATIONS

WIPO, International Search Report and Written Opinion for PCT Application No. PCT/CA2015/000014 dated Mar. 12, 2015.
Balahur et al., Building and Exploiting EmotiNet, a Knowledge Base for Emotion Detection Based on the Appraisal Theory Model, IEEE Transactions on Affective Computing, Jan. 2012, pp. 88-101, vol. 3, Issue 1.
SIPO, Office Action for CN Application No. 201580013261.X dated May 24, 2018.
SIPO, Search Report for CN Application No. 201580013261.X dated May 16, 2018.

* cited by examiner

FIGURE 1 – RSR TECHNIQUE (REVERSE SENTENCE RECONSTRUCT)

FIGURE 2 – PRE-PROCESSING

FIGURE 4 - CLASSIFICATION

FIGURE 5 – SVT (SENTENCE VECTORIZATION TECHNIQUE)

FIGURE 7 - TRAINING

FIGURE 8 - ENHANCEMENT

FIGURE 9 – SYSTEM DIAGRAM cluep  New campaign [+]

Dashboard  Manage  v  My account  v

① Campaign settings  >  2 Target list  >  3 Manage ads  >  4 Budget  >  5 Review & Launch

Campaign settings

Campaign name

[ Sample Campaign ]   Specify an easy to distinguish and simple name for your campaign.

Schedule

[ 01/08/2015 v ]  to  [ 02/08/2015 v ]   How long do you want it to run for?

[ Next Step ]   [ Cancel ]

© 2013 Cluep Inc.

About  Team  Jobs  Contact us  Terms  Privacy

THIS IS AN EXAMPLE OF A SYNTACTIC TEXT TREE WITH DIFFERENT VECTOR VALUES.

SYSTEMS, DEVICES, AND METHODS FOR AUTOMATIC DETECTION OF FEELINGS IN TEXT

CROSS REFERENCE TO RELATED APPLICATION

This application claims the benefit of U.S. Provisional Patent Application Ser. No. 61/925,942 filed Jan. 10, 2014, the entire contents of which is hereby incorporated by reference.

FIELD

Embodiments described herein relate generally to content analysis technologies. Embodiments described herein further relate to natural language processing (NLP).

INTRODUCTION

There have been developments in the fields of information retrieval (IR), natural language processing (NLP), machine learning, deep learning, and statistical modeling.

The basic function of language is to aid in communication. Words communicate meaning but also provide information about social processes. The words we use in daily life reflect who we are and the social relationships that we are in. Language is a common and reliable way for people to translate their internal thoughts and feelings into a form that others can understand.

Electronic communications, including using social networking platforms, are commonplace and generate unprecedented content on the internet. Consumers have integrated electronic and social media into their daily lives and are expressing their feelings through popular social networking sites such as TWITTER™ or FACEBOOK™, LINKEDIN™, YOUTUBE™, GOOGLE+™, INSTAGRAM™, PINTEREST™. The expanded use of social media provides opportunities to reach consumers, for example to build brands or shape opinions.

An important part of interpreting social media content is being able to determine human feelings within text in an accurate manner. Particularly given the volume of content generated through social media, this can be a daunting task.

There exists a need for systems, devices, and methods for automated detection of feelings in text in a variety of fields including social networking, mobile advertising platform, online advertising platform, social media monitoring, content based advertising, service centre management, reputation management and protection, brand management, insurance fraud detection, financial communication platforms, brand loyalty in the consumer good industry, on popular blogging and consumer review and/or discussion platforms, spam detection, document and email classification, recommendation systems, upsell opportunity analysis, suspicious activity identification and other areas.

Human feelings classification on textual data is the process of labelling a human feeling to a string of textual data. Known approaches to providing computer systems that analyze content to detect and classify human feeling may use approaches and methods from fields of information retrieval (IR), natural language processing (NLP), machine learning, statistical modeling and deep learning techniques.

For example, one approach is to use a bag-of-words model of classification. This model takes into account only the words in the phrases and generally involves searching for specific key words in a body of text that would typically match a feeling. The order of the words in the sentence is generally always ignored. For example, a classifier programmed to run using this type of model is given the sentence 'I hate you so much.' and may be further programmed to classify text as being generally indicative of an "angry" or "happy" feeling. The classifier may already have a large pre-processed database of common key words that match to either "angry" or "happy", and may be programmed to run over the sentence checking for any matches. The keyword "hate" may be typically contained in a set of data records associated with "angry" and therefore when the classifier goes over the body of text checking matches for each word, it may get a match with "hate" and therefore label the sentence as "angry".

However, there are challenges with such prior art solutions. For example, if the classifier were again given another sentence "I used to hate them, but not anymore" it would wrongfully label the sentence as "angry" given the hate word in the sentence. Similarly, if negation is involved such as "I hate you, NOT!" the prior art classifier would wrongfully label the sentence. The implications of such an approach include less than desirable accuracy, failure to detect sarcasm, failure to address more complex sentence structures, inability to address the fact that the same words can have different meaning depending on context, and other shortcomings.

There is a need for improved devices, methods, systems and solutions for determining human feelings within text that provide desirable accuracy, and that are scalable for use in conjunction with electronic communications, including social networking mobile and online advertising platforms, or at least alternatives.

SUMMARY

In this respect, before explaining at least one embodiment in detail, it is to be understood that embodiments of inventive subject matter are not limited in its application to the details of construction and to the arrangements of the components set forth in the following description or the examples provided therein, or illustrated in the drawings. Other embodiments are capable of being practiced and carried out in various ways. Also, it is to be understood that the phraseology and terminology employed herein are for the purpose of description and should not be regarded as limiting.

In aspect, embodiments described herein may provide systems and methods that involve at least one client computing device executing an application to transmit a set of text data elements as a feeling classification request. The systems and methods further involve at least one computer processor in communication with the at least one computing device over a communications network to receive the feeling classification request, and in response, transmit a feeling classification response, the computer server configuring a text analysis engine, a reverse sentence reconstruct (RSR) utility for determining grammatical and semantic structure of the set of text data elements, and a sentence vectorization technique (SVT) utility to generate SVT models, wherein the computer server is configured to compute the feeling classification response using the RSR utility and SVT utility, wherein the RSR utility interacts with the SVT utility to provide a parsing component to generate a syntactic text tree with the text data elements and a classification component to classify feeling of the text data elements for the feeling classification response. At least one data storage device store the SVT models, a labelled text corpus and a slang and spelling dictionary.

BRIEF DESCRIPTION OF THE DRAWINGS

Embodiments described herein may be better understood and objects thereof may become apparent when consideration is given to the following detailed description thereof. Such description makes reference to the annexed drawings wherein:

FIG. 12 illustrates a display screen providing a user interface for defining campaign settings for an advertising application.

FIG. 17 illustrates a display screen providing a user interface for managing advertisements for an advertising application.

FIG. 18 illustrates a display screen providing a user interface for defining a budget for an advertising application.

Figure 1:
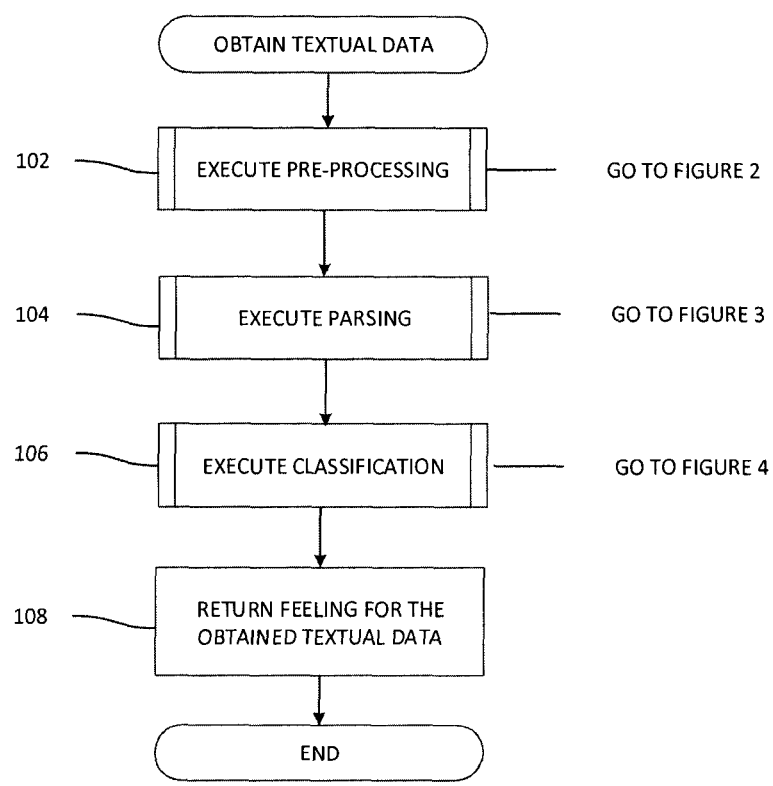
FIG. 1 depicts an overview of a computer system implemented method for determining feeling in text using a reverse sentence reconstruct technique (RSR) in accordance with embodiments.

In the drawings, embodiments are illustrated by way of example. It is to be expressly understood that the description and drawings are only for the purpose of illustration and as an aid to understanding, and are not intended as a definition of the limits of the invention.

DETAILED DESCRIPTION

The embodiments of the systems and methods described herein may be implemented in hardware or software, or a combination of both. These embodiments may be implemented in computer programs executing on programmable computers, each computer including at least one processor, a data storage system (including volatile memory or non-volatile memory or other data storage elements or a combination thereof), and at least one communication interface. For example, and without limitation, the various programmable computers may be a server, network appliance, set-top box, embedded device, computer expansion module, personal computer, laptop, personal data assistant, cellular telephone, smartphone device, UMPC tablets and wireless hypermedia device or any other computing device capable of being configured to carry out the methods described herein.

Program code is applied to input data to perform the functions described herein and to generate output information. The output information is applied to one or more output devices, in known fashion. In some embodiments, the communication interface may be a network communication interface. In embodiments in which elements of the invention are combined, the communication interface may be a software communication interface, such as those for inter-process communication. In still other embodiments, there may be a combination of communication interfaces implemented as hardware, software, and combination thereof.

Each program may be implemented in a high level procedural or object oriented programming or scripting language, or a combination thereof, to communicate with a computer system. However, alternatively the programs may be implemented in assembly or machine language, if desired. The language may be a compiled or interpreted language. Each such computer program may be stored on a storage media or a device (e.g., ROM, magnetic disk, optical disc), readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the systems and methods of the described embodiments are capable of being distributed in a computer program product including a physical, non-transitory computer readable medium that bears computer usable instructions for one or more processors. The medium may be provided in various forms, including one or more diskettes, compact disks, tapes, chips, magnetic and electronic storage media, volatile memory, non-volatile memory and the like. Non-transitory computer-readable media may include all computer-readable media, with the exception being a transitory, propagating signal. The term non-transitory is not intended to exclude computer readable media such as primary memory, volatile memory, RAM and so on, where the data stored thereon may only be temporarily stored. The computer useable instructions may also be in various forms, including compiled and non-compiled code.

Throughout the following discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions. One should further appreciate the disclosed computer-based algorithms, processes, methods, or other types of instruction sets can be embodied as a computer program product comprising a non-transitory, tangible computer readable media storing the instructions that cause a processor to execute the disclosed steps. One should appreciate that the systems and methods described herein may automatically transform textual data received at a receiver into classified feelings for transmission via a transmitter, or other output device.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

In various aspects, the disclosure provides a computer system or technology platform (may be referred to as "platform") that enables determination of a feeling in text. The platform implements a series of novel and innovative approaches to determination of a feeling in a set of text data elements.

In one aspect of the embodiments described herein, the platform includes hardware particularly configured to provide a text analysis engine (14) that when executed classifies text data accurately (based on a plurality of set of feeling classifications) by extracting, and managing, grammar elements and the semantics of a sentence, and the relations between the words/phrases in the text data.

The embodiments described herein are implemented by physical computer hardware. The embodiments described herein provide useful physical machines and particularly configured computer hardware arrangements of computing devices, servers, electronic gaming terminals, processors, memory, networks, for example. The embodiments described herein, for example, is directed to computer apparatuses, and methods implemented by computers through the processing of electronic data signals.

The embodiments described herein involve computing devices, servers, text processing engines, receivers, transmitters, processors, memory, display, networks particularly configured to implement various acts. The embodiments described herein are directed to electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, a various hardware components.

Substituting the computing devices, servers, text processing engines, receivers, transmitters, processors, memory, display, networks particularly configured to implement various acts for non-physical hardware, using mental steps for example, may substantially affect the way the embodiments work.

Such computer hardware limitations are clearly essential elements of the embodiments described herein, and they cannot be omitted or substituted for mental means without having a material effect on the operation and structure of the embodiments described herein. The computer hardware is essential to the embodiments described herein and is not merely used to perform steps expeditiously and in an efficient manner.

Figure 9:
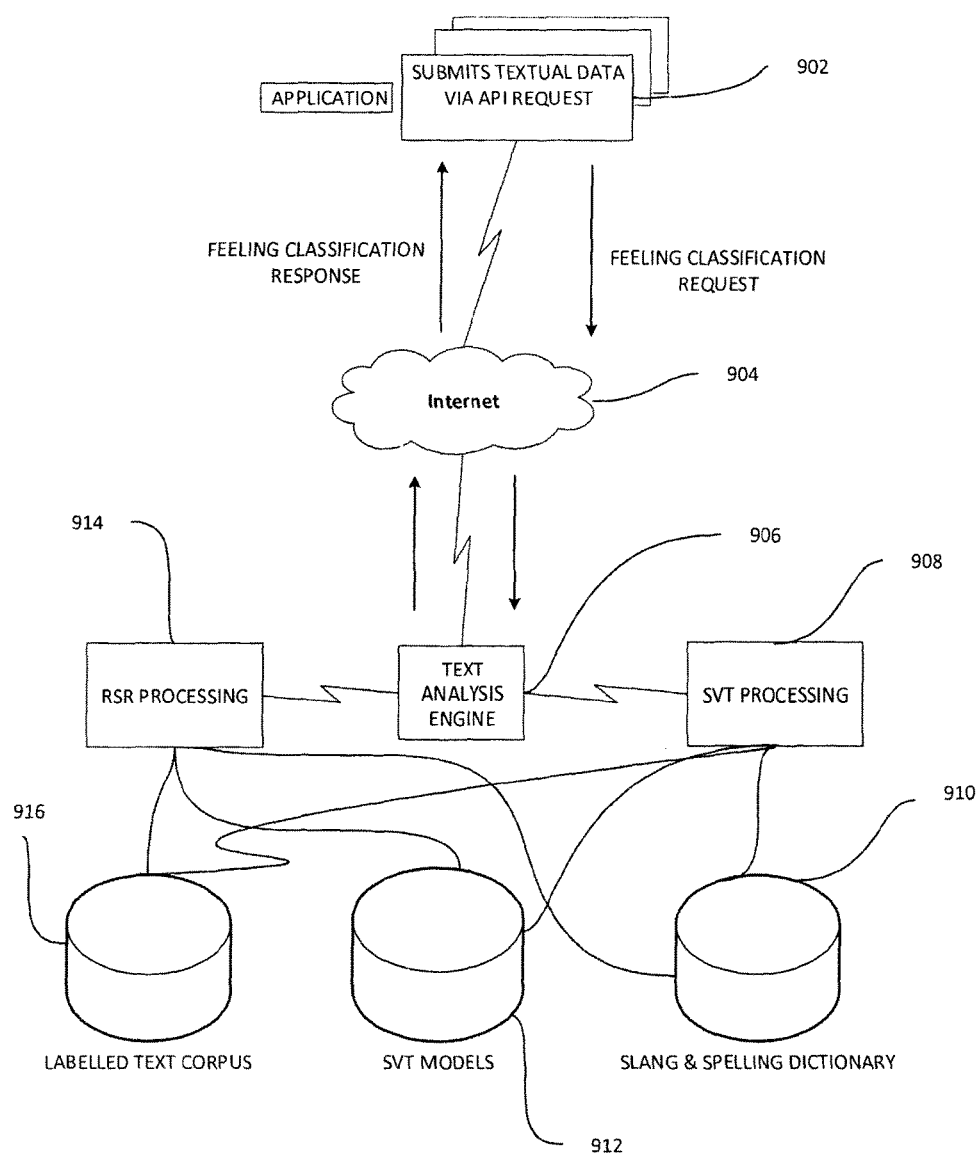
FIG. 9 illustrates a computer system diagram showing possible implementations of the network implemented computer platform in accordance with embodiments.
Figure 11:
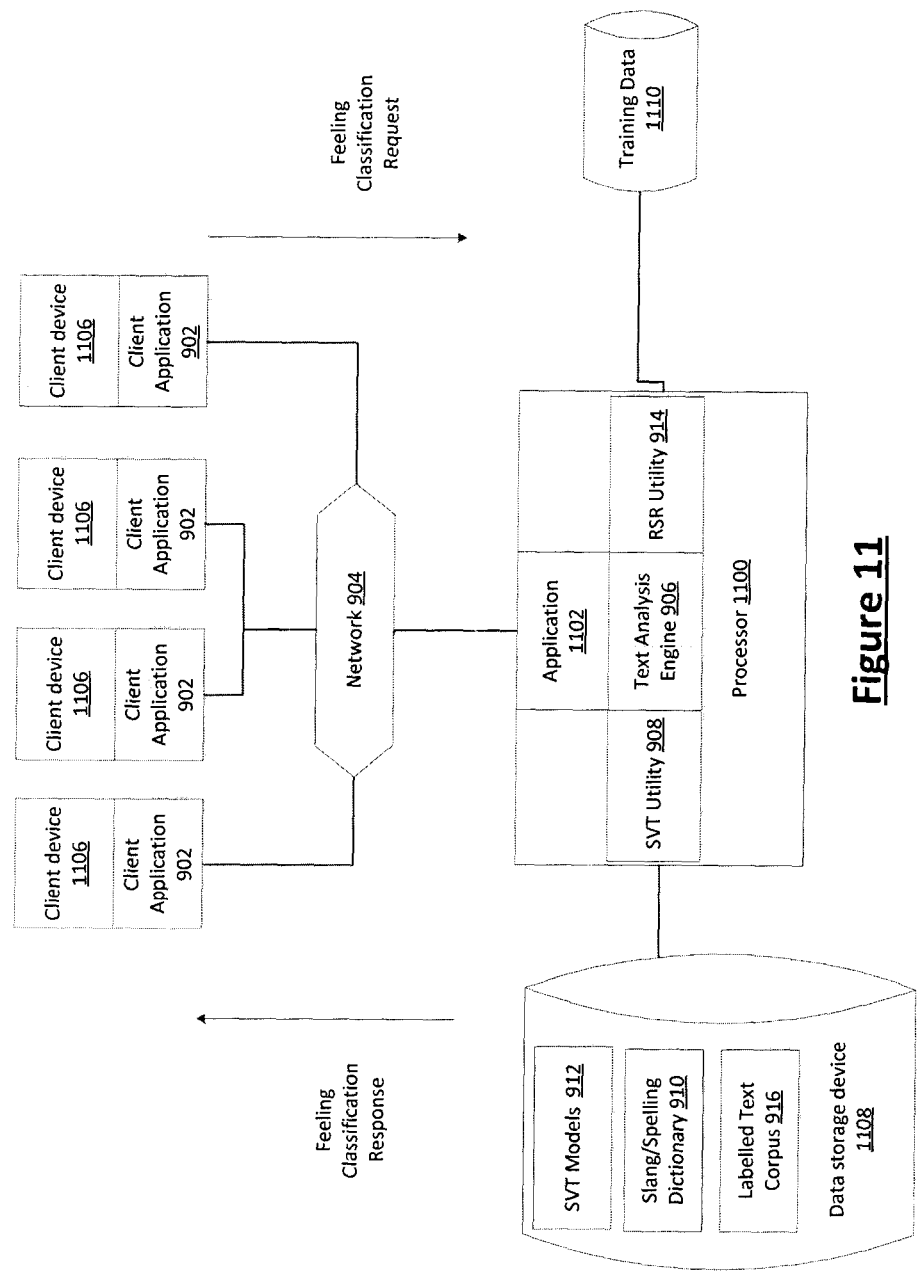
FIG. 11 illustrates another example system diagram showing possible implementations of the network implemented computer platform in accordance with embodiments.

Referring now to FIGS. 9 and 11, there is shown a computer system implementation according to some embodiments.

The computer system, as shown in FIG. 11, may be implemented by a server processor (1100), which may also be implemented by a server farm or a cloud computing service. The server processor (1100) may be implemented using one or more processors and coupled to one or more data storage devices 1108 configured with database(s) or file system(s), or using multiple devices or groups of storage devices 1108 distributed over a wide geographic area and connected via a network (which may be referred to as "cloud computing").

The server processor (1100) may reside on any networked computing device, such as a dedicated hardware server, personal computer, workstation, server, portable computer, mobile device, personal digital assistant, laptop, tablet, smart phone, WAP phone, an interactive television, video display terminals, gaming consoles, electronic reading device, and portable electronic devices or a combination of these.

The server processor (1100) may be any type of processor, such as, for example, any type of general-purpose microprocessor or microcontroller, a digital signal processing (DSP) processor, an integrated circuit, a field programmable gate array (FPGA), a reconfigurable processor, a programmable read-only memory (PROM), or any combination thereof. The server processor (1100) may include any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

The server processor (1100) may connect to one or more input devices, such as a keyboard, mouse, camera, touch screen and a microphone, and may also include one or more output devices such as a display screen and a speaker. The server processor (1100) has a network interface in order to communicate with other components, to access and connect to network resources, to serve an application and other applications, and perform other computing applications by connecting to a network 904 (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these. There may be more than one server processor (1100) distributed over a geographic area and connected via a network.

The server processor (1100) may be linked to a server application (1102), which may also be implemented as an application repository on a data storage device. The server application (1102) provides an interface to components of the server processor (1100) including a text analysis engine (906), shown in FIGS. 9 and 11, which may be implemented as a series of modules, which execute functionality of aspects of embodiments described herein. The server processor (1100) further configures a RSR utility (914) and a SVT utility (908). FIG. 9 illustrates the components individually, which may be implemented by the same processor or different connected processors.

A series of client devices (1106) may connect to the server processor (1100) in order to access electronic data signals defining feeling analysis features of embodiments described herein. The client devices (1106) may be implemented using one or more processors and one or more data storage devices configured with database(s) or file system(s). The client devices (1106) store and execute a client application (902) that interfaces with server processor (1100) via application programming interface (API) requests.

These client devices (1106) may be a network connected device whether a desktop computer, personal computer, workstation, server, portable computer, mobile device, personal digital assistant, laptop, tablet device, smart phone, WAP phone, an interactive television, video display terminals, gaming consoles, electronic reading device, portable electronic devices or a combination of these, or other computing device with network connectivity. The client device (1106) may also be a third party computer network service such as a social networking platform that utilizes the feeling analysis services of the server processor (1100).

The client device (1106) may include at least one processor, such as, for example, any type of general-purpose microprocessor or microcontroller, a digital signal processing (DSP) processor, an integrated circuit, a field programmable gate array (FPGA), a reconfigurable processor, a programmable read-only memory (PROM), or any combination thereof. The client device (1106) may include any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

The client device (1106) may include one or more input devices, such as a keyboard, mouse, camera, touch screen and a microphone, and may also include one or more output devices such as a display screen and a speaker. The client device (1106) has a network interface in order to communicate with other components, to access and connect to network resources, to serve an application and other applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these. There may be more client devices (1106) distributed over a geographic area and connected via a network. The client device (1106) is operable to register and authenticate users (using a login, unique identifier, and password for example) prior to providing access to applications, a local network, network resources, other networks and network security devices. The client device (1106) may be different types of devices and may serve one user or multiple users.

Alternatively, the server processor (1100) may be made part of an existing social networking platform. Various other configurations are possible for providing access to the feeling analysis functions of the embodiments described herein.

In one possible implementation, a data storage device (1108) is linked to the computer system. The data storage device (1108) may persistently store electronic data signals defining SVT models 912, labelled text corpus 916, and a slang/spelling dictionary 910, for example.

The client application (902) residing at client device (1106) may transmit a feeling classification request to the server processor (1100) as textual data. The server processor (1100) may process textual data to detect and classify feelings associated with the textual data and generate a feeling classification response based on the processed textual data. These feelings may include, but not limited to, for example the following feelings: Happy, Sad, Tired, Great, Wonderful, Annoyed, Excited, Sorry, Scared, Loved, Pretty, Special, Sick, Good, Awesome, Bad, Better, Guilty, Amused, Down, Hopeful, Alone, Angry, Safe, Lonely, Blessed, Free, Curious, Lost, Old, Irritated, Lazy, Worse, Horrible, Comfortable, Stupid, Determined, Sexy, Ashamed, Fresh, or Neutral. These are an arbitrary, illustrative, example list of feelings that are used in an example implementation of the system. Other feelings may be selected. The feelings may be recorded as electronic data signals forming part of feeling records persistently maintained by a data storage device (1108) as various data structures, including labelled text corpus 91.

The labelled text corpus 91 is a large set of labeled syntactic text trees that defines or expresses the feeling and part of speech of each tree node.

The syntactic text trees provide an effective way to represent textual features used in the RSR and SVT process to aid in the quick expression of the feeling. The syntactic text trees define feature types that include, but are not limited to simple phrases, emoticons, part-of-speech tags or a dependency relation. The data storage device may store the syntactic text trees as binary data to be able to use minimal space in the memory component of a computer, and as text data to save memory space. The syntactic text trees may link text data elements such as words or phrases that map to particular feelings. The syntactic text trees may be updated automatically over time as more textual data is parsed and classified, for example. A set of text data elements may include a sentence or phrase, for example, and a derivative thereof may be stored as a syntactic text tree after it has been processed and analyzed, as explained herein.

In accordance with some embodiments, the same sentence may map to more than one feeling. In one example implementation, a series of tables may be defined for each feeling; the tables may contain the linked groups of text data elements. The tables may be stored as a data structure at a persistent data store for subsequent reference, modification, and retrieval. These tables may be updated over time to better adjust to more textual data size, and to reflect modifications to stored data. Also, syntactic text trees may define dependencies within a group of text data elements, such as a sentence, may be mapped and linked.

An example of a more general feeling classification may be Neutral. A more general feeling classification may be used in combination with the other more specific feeling classifications described herein, to further improve accuracy and also to act as a default classification in the event that text data does not map with sufficient specificity to either one of the more particular classifications. This may give the ability for the classifier to determine the a general feeling if a more specific feeling cannot be detected with sufficient confidence level. Another usage of this may be to enable validation of the confidence of the more general feeling classification. For example, if the more general feeling is present in the textual data then more corresponding specific feelings may have an increase in probability of being present as well. Doing a confidence check on both different levels of granularity of feelings \ may improve the accuracy of the of the classification.

Embodiments described herein provide a scalable system that may have an ability to more accurately classify one or more feelings associated with text data elements by correctly parsing and classifying the text data elements automatically, using a particularly configured scalable computer platform, to a relatively large set of feelings that in aggregate cover a wide range of possible feeling options. Embodiments described herein may therefore be likely to accurately return the intended feeling of the entity that expressed the text data elements. Further, the part-of speech and syntactic text tree structure are classified as well.

In one aspect of embodiments described herein, the computer system may be particularly configured with control logic to implement two techniques in combination to determine feeling classification response from text data elements, namely: RSR and SVT. The text analysis engine (906) may execute RSR Utility 914 and SVT Utility 908, as further detailed herein. Each of the technologies, namely RSR and SVT, may be may be used in a number of applications.

The approach taken by embodiments described herein may be to determine a dominant feeling of a collection of words or phrases, taking into account that the same word for example may map to multiple feelings. The text analysis engine (906) may calculate confidence scores for different words and phrases, using the activation function in the syntactic text tree vectors to determine the dominant feeling. In accordance with some embodiments, the text analysis engine (906) uses the RSR's SVT data structure representation of the text's related semantic tree in a bottom-up approach from the lowest semantic representation which includes the individual words, to the semantic representation of the phrases present, to the semantic representation of the entire text. The data structure representation of the vector may be persistently stored as a data storage device for reference by the text analysis engine (906). The SVT vector representation uses electronic data signals to define a series of connected word/phrase vectors each connected in a way similar to a path of the semantic text tree, where each vector being given their own value according their semantic value in the tree. A word/phrase vector is represented as an array of data signals, and functions as an electronic computational unit that receives inputs and implements processing based on control logic to e.g. sum up the product of each of the inputs' respected vector values to be used to calculate an output value by an activation function (e.g. logistic function) programmed by the control logic. The activation function is a mathematical function that outputs a value between 0 and 1 for any input value given. The vectors express all the nodes in the tree. These vector values are used to calculate the value it outputs to the next vector and the feeling it currently is at. If the vector is the top node it just determines the feeling. The forward propagation process involves calculating and passing on the values that are mathematically determined by the activation function from the learned values of each of the connected vectors in the network in series, starting at the beginning of the tree to the end. Such an example of such a function is the sigmoid function. The activation function takes in the vector values of the vector and the values obtained from the previous vector. In the case that the vector is at the bottom of the tree and only expresses one word, the value is defined by the individual word the vector expresses. The activation is calculated by summing the product of the vector values respectively which may then be fed into the sigmoid function. The class with the highest activation is assigned the feeling of that particular node.

In accordance with some embodiments, the vector values for each vector is represented as mathematical vectors ranging from −1 to 1 with an arbitrary length that is the same across all the vectors. The vector values are optimized beforehand during a training process. The training process changes or modifies the vector values by a means of supervised learning, where the network is given a large set of a labelled text corpus and makes small changes one by one to each vector values to be able to match the output of the labelled text corpus as close as possible. The labelled text corpus (e.g. labelled text corpus 916) includes a large set of parsed sentence trees, labeled at each node by its respected feeling. The label for each of these nodes may be automatically determined, for example, by the highest frequency occurrence of that node's phrase present in a larger set of raw text that are labeled individually by the feeling. The confidence score may be determined for each class by the use of a final activation function which describes the feeling of the entire text data below it. Once done, all the nodes starting from the bottom of the tree to the top are accurately labeled with the accurate feeling.

Referring now to FIG. 1, there is shown a computer-implemented method for determination of a feeling in a set of text data elements, in one possible implementation of embodiments described herein. As illustrated in FIG. 1, a set of text data elements or textual data may be obtained and at 102 the computer platform may execute a pre-processing technique using programmed control logic. The computer platform may include a receiver to receive the textual data. The computer platform may implement steps of FIG. 1 to transform the received textual data (as part of the feeling classification request) into a classified feeling (as part of the feeling classification response).

At 104, the computer platform may execute parsing to evaluate semantic patterns in the text such as the part of speech tags, the word placement and whether the words follow at the beginning, middle or end of the sentence, the dependency placement which describes the word's dependency relation with other words in the sentence and/or even the presence of specific word tokens the likes of which include emoticons and emotion expression.

At 106, the computer platform may execute classification to classify the particular feeling for the textual data. The labelled text corpus 916 may be updated with these text data elements and associated word sense, in order to enrich the data collection. This provides the advantage that in the future, the text mapping with RSR and SVT may be better adapted to handle the quick evaluation of text of similar kind given the constant addition of more feeling record tree structures.

RSR and SVT enables the complete semantic deconstruction and analysis of the text data elements, as described below, and ultimately an automated update of the feeling records for future use. Receiving the same or almost the same set of text data elements thereafter may permit efficient feeling determination. In effect, the design of the computer platform promotes its scalability and efficiency. The computer platform is configured and designed to implement deep learning aspects that enhance iteratively the ability of the platform to analyze text data accurately, effectively and quickly.

It is also noted that RSR and SVT are both designed to enable rapid analysis and generation of results. RSR particularly may be executed extremely quickly thus providing an efficient, scalable solution, while providing accuracy that far exceeds the accuracy that is possible using prior art solutions.

Using SVT utility 908, the text analysis engine (906) of the present invention builds a relatively complete set of feeling records—and associated text data elements—over time.

At 108, computer platform returns the classified feeling for the obtained textual data as a feeling classification response. The computer platform may include a transmitter to transmit the data to an external system or other component. Accordingly, the computer platform automatically transforms the received textual data into classified feeling data using SVT and RSR techniques.

In one possible implementation, the server application (1102) includes an application programming interface (API) that is configured to enable external users (through their client device (1106)) and their applications (902) to connect to the computer network service implemented by the server processor (1100). The API is used to provide to the computer system text data elements in one or more formats, such as for example JSON or XML. The API may be accessed by establishing a peer-to-peer connection with the API server and providing an HTTP request. The text analysis engine (906) executes a series of routines that include routines based on RSR and SVT so as to classify the text data based on feeling, and return to the external users and their applications, in real time or near real time, feeling assessment results (e.g. feeling classification responses). These results may be in a format that may be specified by the client device (1106) or by an associated application.

The role of an application is to enable third party or in-house users to classify textual data from the text analysis engine via API request. The back-end server processor (1100) is used to run, process textual data and store the needed data for the text analysis engine.

The text analysis engine (906), in one possible aspect, is operable to analyze any manner of text input such as sentences, paragraphs, essays, or other documents.

In one possible implementation, data storage device (1108) includes a feeling record for each of the feeling classifications, and a plurality of word elements may be mapped to each such feeling record. Significantly, the same word may be related to more than one feeling record.

For example, the word "sick" can express at least two possible feelings. The first, in "My friend is sick."—the word "sick" may be associated with the feeling of "Sad". However, in slang, the word "sick" also expresses the feeling of "Loved". As another illustrative example, the word "unreal" can be expressed in both a positive and negative feeling. Positively with feeling of "Happy" in the sentence "dam! That killing spree in COD was unreal man!" and negatively with a feeling of "Sad" in "This nokia phone is so awful it's unreal". As an additional illustrative example, the word "special" can be expressed in both positive and negative feeling amongst others. For example, it may be expressed positively with a feeling of "Loved" in "Yes! I got the first PS4, I feel special!" and negatively with a feeling of "Angry" in "Obama falls into that special group of people that don't understand what a failure the affordable healthcare act is." In another example, the word "silly" can be expressed in both positive and negative feeling. Positively with a feeling of "Loved" in "My boyfriend acts so silly around me it's adorable" and negatively with a feeling of "Scared" in "Okay, let's not make any more silly decisions about investing more in bitcoins in this bull market."

In one aspect of embodiments described herein, the RSR utility includes a classifier or classification component.

In one particular implementation a number may be assigned to each feeling record. In the case of a sentence for example, the word elements may be mapped to the two or more associated feeling records, and the sentence may then be as a series of numbers based on the numbers of the associated feeling records. These strings of numbers enable the identification of patterns.

An analytics utility may be integrated into the text analysis engine (906) that tracks the operations of the text analysis engine (906) and automatically generates trend data and based on a set of rules may make corrective changes to mappings of text data elements to the feeling records. The analytics utility may be configured with control logic to implement adaptive learning over time. The set of rules may include the redistribution of mappings of the text data elements to other class records. This redistribution may be done with a statistical model that shows reason to do so after analyzing multiple cases in text where the mapping fits other class records.

For example, since the word 'sick' may be used in multiple contexts that include both positive and negative, the RSR and SVT technique implemented by the computer platform may enable the platform to automatically recognize this as it learns by confirming that it is true in text processed over time that contain the word 'sick' within it. As the amount of text being processed grows over time, the analytics utility may automatically pick it up or recognize it in more cases. The structure of the syntactic text tree may pick up or recognize the multiple contexts.

In another aspect of embodiments described herein, the analytics utility may be configured with control logic to flag sets of text data elements for whom determination of feeling may be ambiguous. These flags may be presented to a computer system user who curates the computer system operations. The computer system may include various tools for managing associated workflow. In addition, a crowd sourcing platform may be linked to the computer system to leverage the resources of a pool of users to accurately map the feeling associated with the text data elements.

RSR Technique—Pre-Processing

Figure 2:
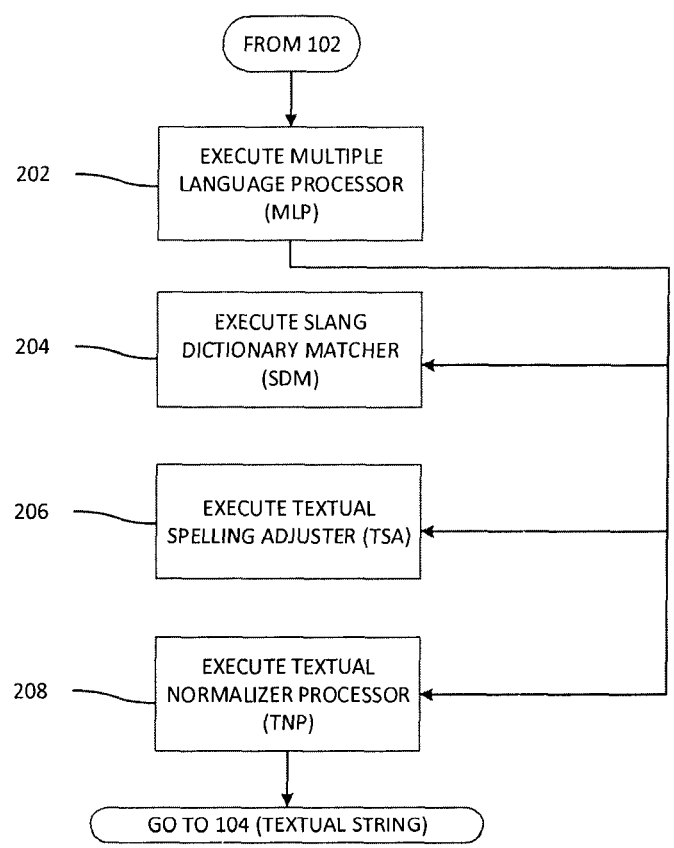
FIG. 2 shows in greater detail the step of pre-processing by the RSR method in accordance with embodiments.

In one aspect of embodiments described herein, RSR utility (914) may implement a series of operations for pre-processing (e.g. step 102 of FIG. 1) text data elements, as shown in detail in FIG. 2.

In one aspect of embodiments described herein, the RSR utility (914) implements one or more routines for pre-processing a set of text data elements by: converting multiple languages (at 202), switching out uncommon slang terms (at 204), fixing accidental spelling mistakes in the set of text data elements (at 206), and removing any unwanted sentence formalities or abnormalities (at 208). These are illustrative examples only.

RSR utility (914) implements pre-processing to convert a set of text elements representing one or more phrases or sentences into a pre-processed textual string (e.g. a byte representation of characters) as output.

As shown in FIG. 2, at 202, RSR utility (914) executes a multiple language processor (MLP).

To support classification of text from other languages without requiring a language-specific parser RSR utility (914) executes MLP. The goal of the MLP is to convert the language-specific text into English text (or other standard language) while keeping as much as the original semantics as possible. The MLP may work as follows: The language-specific text may be stripped of its hashtags, handles and informalities. A TEXT TRANSLATOR may translate the text into English (or other standard language) and returns it back as a string. The TEXT TRANSLATOR can be implemented as a RESTFUL API or as an offline software application, for example. The hashtags and handles are attached back to the English-translated text and sent to the parser as if it was originally in English. The output may be a textual string.

At 204, RSR utility (914) executes a slang dictionary matcher (SDM).

Slang and short-form words may be common occurrences in social media contexts. RSR utility (914) executes SDM as a dictionary-based filter to normalize words. A few examples include, 'Thnks'→'thanks', 'tyty'→'thank you thank you', '2 much'→'too much'. SDM works by storing a large set or collection of slang and short-form words commonly found in Internet text and matching it to the proper word it should formally map to. This works in the same sense a dictionary maps a word to its definition. An example SDM process is described. Given a string of text, the text may be tokenized by each word. Each word may be crosschecked with a pre-populated dictionary list of common slang words. If a match for a word is found, the word may be replaced with the proper word. The tokenized list of words may be converted back to a string of text.

At 206, RSR utility (914) executes a textual spelling adjuster (TSA).

Misspelled words may be common occurrences in social media contexts. For example, 'wroking tonigth ughh' should be interpreted as 'working tonight ughh'. RSR utility (914) executes TSA that includes a SPELL CHECKER and a SPELL FIXER. The SPELL CHECKER runs through the words of the text and corrects any misspelled word that are present using the SPELL FIXER. An example TSA process is described. Given a string of text, the text is tokenized by each word. A SPELL CHECKER evaluates each word for any spelling errors. The SPELL CHECKER works by cross-checking each word with a known list of correctly spelled words. For any misspelled words, a SPELL FIXER may use an NLP-based algorithm to check if the wrong spelling is due to plurals, verbal forms or root words. It makes any corrections if needed. The corrected list of words is converted back to a string of text.

At 208, RSR utility (914) executes a textual normalizer processor (TNP).

RSR utility (914) executes TNP as a set of techniques and methods that normalize uncommon and unneeded sentence abnormalities commonly found in informal text such as SMS and social media. TNP includes a REPEATED WORD STOPPER(ex. 'slooooow down'→'slow down'), EMOTICON MATCHER, (ex. :), :D→'em_pos') and a REPEATED PHRASE MATCHER (ex. lolololor→'hehehehehe'→'hehe'). These methods may be implemented as a search matching by RSR utility (914) with our preprogrammed searching rules. An example TNP process is described. Given a string of text, the text is fed as input into the TNP. Using regular-expression software, the text is scanned for sentence abnormalities by TNP's searching rules. If sentence abnormalities are discovered, the abnormality is replaced with the proper form. The edited text is outputted as a string.

Unwanted sentence formalities may relate to the type of document being classified, for example, parsing data that is labelled as a being a tweet from Twitter. In tweets, @ handles provide little aid in the feeling evaluation of the tweet so the @ handler may be replaced by a common placeholder such as person identifier. More preprocessing steps include but not limited to removing multiple repeated characters present in a word such as 'hungryyyyyyyy' to 'hungry' and 'tastyyyy' to 'tasty', removing repeated tokens to be expressed in a simpler sense such as 'hahahahaha' to 'ha' or 'lolololol' to 'lol' as well instances where emphasis is given to words such as 'hateeee', 'soooo' etc. These unwanted sentence formalities may be removed as described. The RSR utility (904) may detect the type of document represented by the set of text data elements to assist with pre-processing. This pre-processing aspect improves the ability of the classification component to understand the accepted meaning of the text data elements. The implementation of this pre-processing component may be constructed by applying predefined computing search patterns such as regular expressions which apply search and replace rules to edit out repeated characters and tokens, spelling-correction algorithms that incorporate the use of determining edit distance to fix common spelling mistakes, a probabilistic model which incorporates n-gram probabilities to be used to fix unwanted sentence informalities, and a database of slang-to-proper word mappings to index through and replace common slang words in the text into a proper word such as 'ur' to 'your'. The processes described are constructed to work together in parallel to solve the problem as a whole in the most effective and efficient way instead of each process solving it separately and in serial order.

RSR Technique—Parsing

Figure 3:
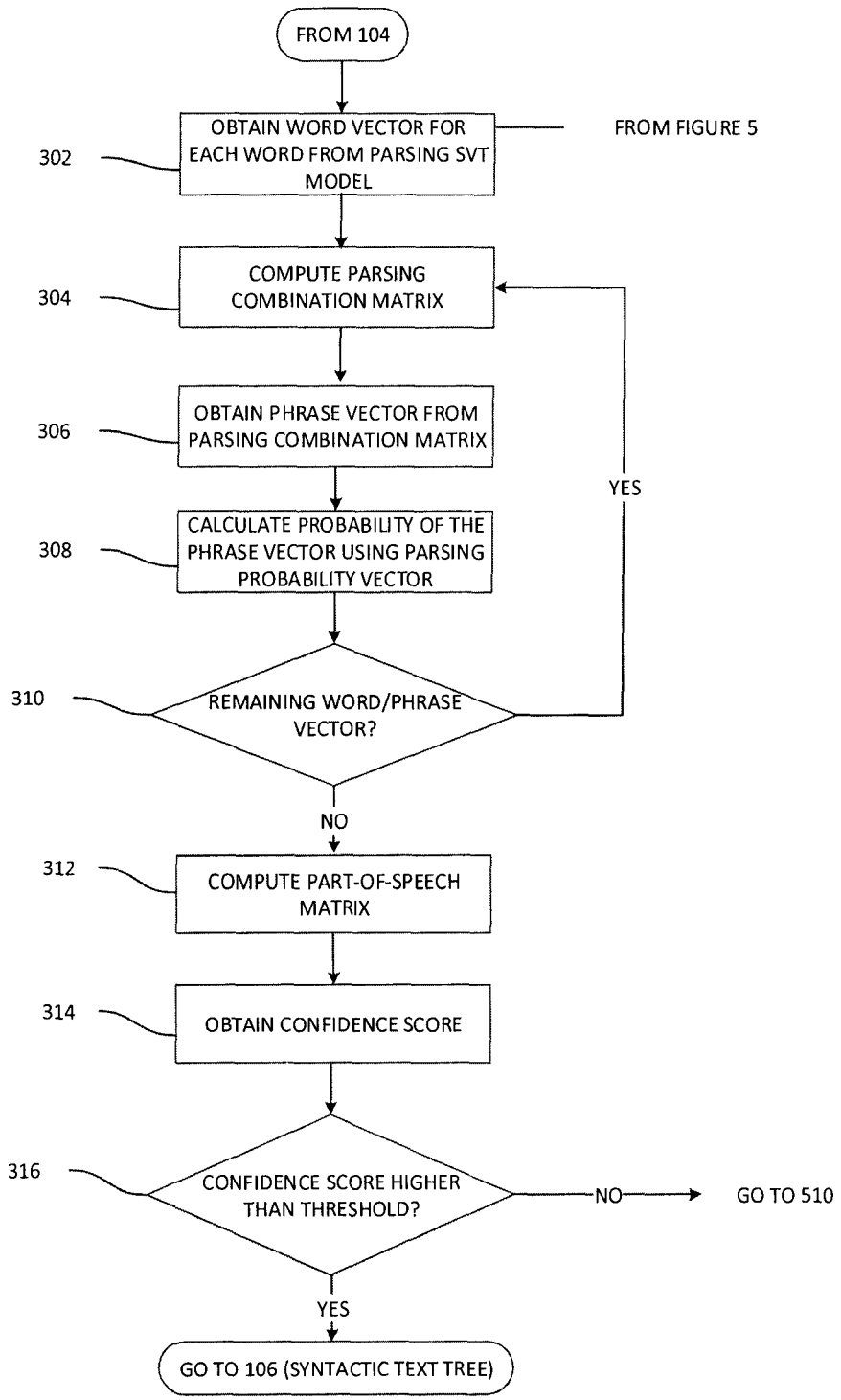
FIG. 3 shows in greater detail the step of parsing by the RSR method in accordance with embodiments.

RSR Utility (904) is configured with a parsing component to generate a syntactic text tree from the pre-processed textual data (e.g. FIG. 1 at 104). The syntactic text tree has each node labeled with its corresponding part-of-speech. FIG. 3 provides further details of parsing.

RSR Utility (904) configures the parsing component to convert the textual string into a syntactic text tree using a parsing SVT model trained by the techniques described in relation to the SVT utility (908). A syntactic text tree defines the grammatical relationship between the words in the sentence or phrase. The syntactic text tree assigns a part-of-speech to each word or phrase vector of the textual data elements.

Figure 22:
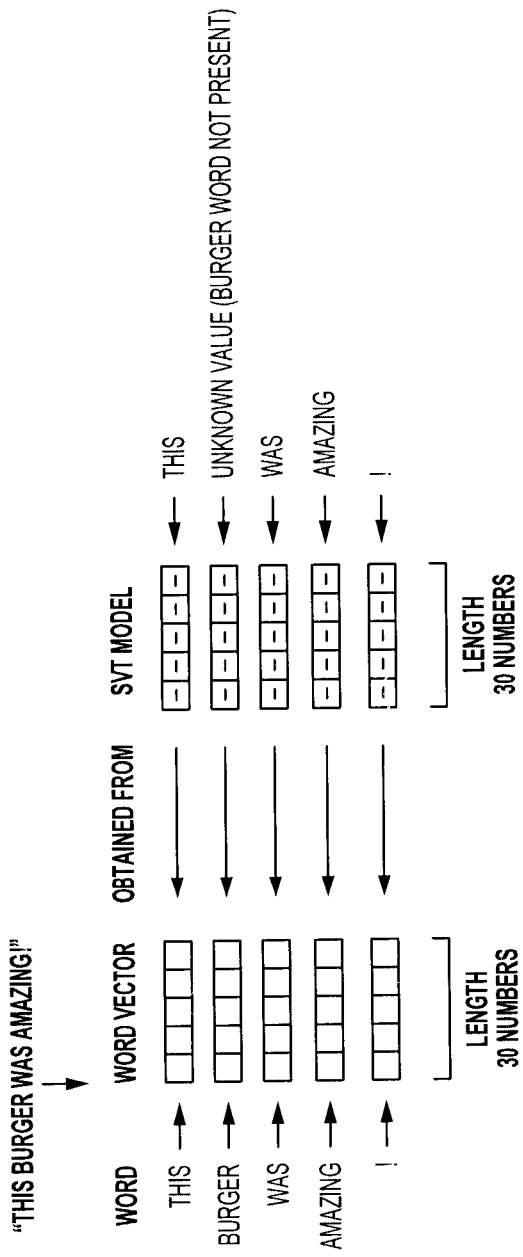
FIGS. 22 to 26 illustrate examples of parsing in accordance with embodiments.

At 302, for each word of the pre-processed text data elements, the parsing component of the RSR Utility (904) obtains a word vector from a parsing SVT model (stored in data storage device 1108) of the SVT utility (908). That is, given a string of text, the corresponding word vector for each word is obtained from the parsing SVT model. FIG. 22 illustrates an example text string "This burger was amazing!". The parsing component obtains five word vectors from the parsing SVT model, as shown.

Figure 23:
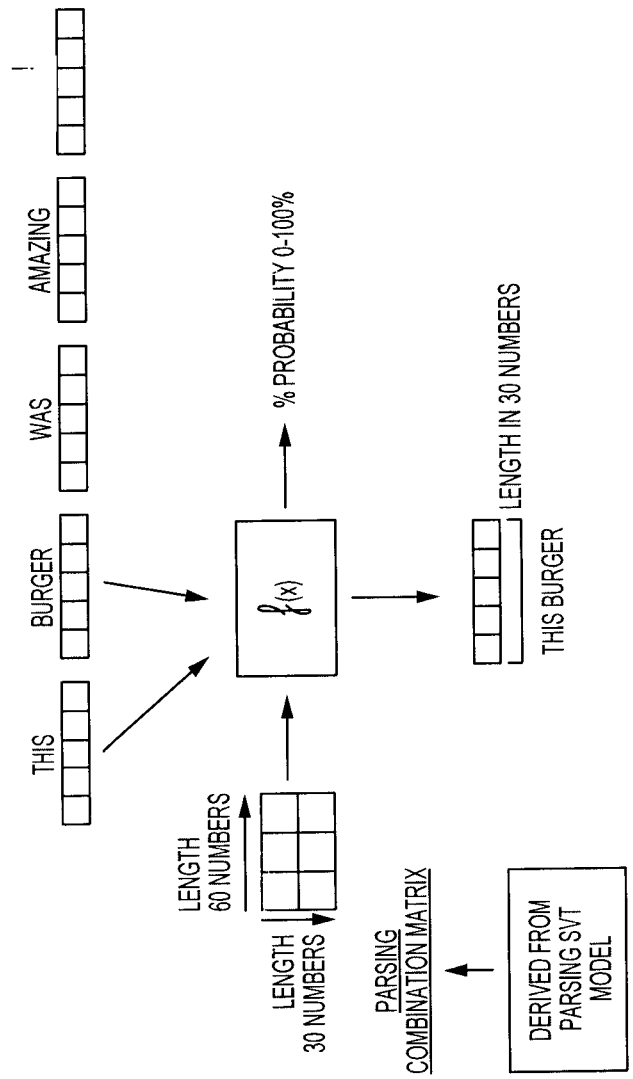

For each word vector, at 304, the parsing component of the RSR Utility (904) computes a parsing combination matrix. FIG. 23 illustrates an example using the five word vectors from the example text string "This burger was amazing!".

The parsing combination matrix may be created during the pre-training step of the parsing SVT model, as described herein. For example, the parsing combination matrix may be a matrix with a size of d×2d, with 'd' being the length of the word vector. The values are reconfigured during the training step. The function of the parsing combination matrix is for creating new phrase vectors in the parsing step.

At 306, the parsing component obtains a phrase vector from the parsing combination matrix, and at 308, calculates probability of the phrase vector using a parsing probability vector.

In a left-to-right approach, each word vector may be combined with the word vector of the neighboring word. Using the parsing combination matrix found in the parsing SVT model, the probability of how well each of the word pairs can combine is calculated and noted. The probability is computed by the parsing probability vector from the SVT model.

Using the operation of 'Matrix Multiplication', the parsing component may multiple the word/phrase vector pair with the SVT parsing combination matrix to generate a new phrase vector. Matrix Multiplication is a binary operation that takes a pair of matrices and produces a new matrix. The parsing component then proceeds to apply a logistic function to each value of the new vector. To generate the probability for the new phrase vector, the parsing component may use the parsing probability vector to multiply and sum the phrase vector values. A logistic function expresses a value between 0 and 1.

Example logistic functions include softmax and tan h.
Softmax:

$$\sigma(z)_j = \frac{e^{z_j}}{\sum_{k=1}^{K} e^{z_k}}$$

Tan h:

$$\tanh x = \frac{\sinh x}{\cosh x} = \frac{e^x - e^{-x}}{e^x + e^{-x}} = \frac{e^{2x} - 1}{e^{2x} + 1} = \frac{1 - e^{-2x}}{1 + e^{-2x}}$$

Figure 24:
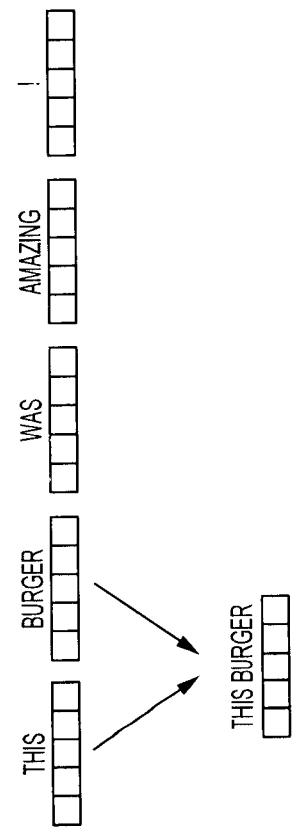

FIG. 24 illustrates an example phrase vector for "This burger" resulting from the combination of word vectors for "This" and "burger". The word pair with the highest probability is combined by attaching a parent node to the node of both words. The phrase vector is produced from this combination. this phrase vector represents the new phrase produced in the same way the word vector represents the word.

Figure 25:
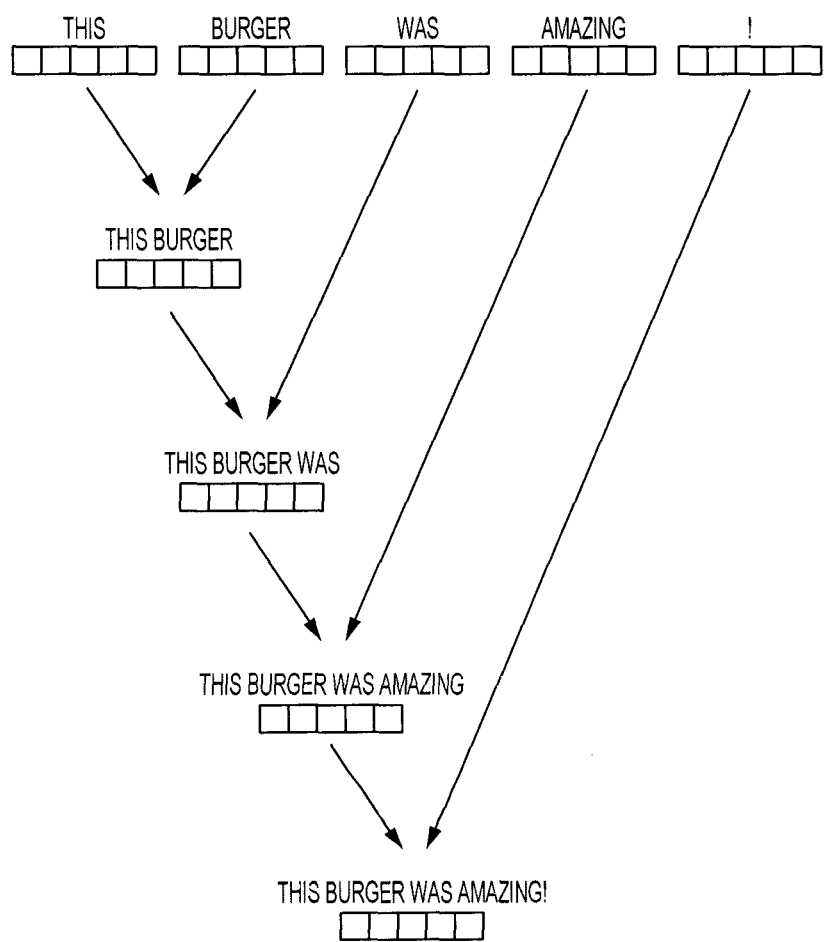

At 310, the parsing component determines whether there is a remaining word vector from 302, and if so, repeats process 304, 306 and 308 for all word vectors until the entire syntactic tree structure is generated. The parsing component may treat each new phrase vector produced as a word vector in the computational step. FIG. 25 illustrates an example of the phase vectors.

At 312, the parsing component computes a part-of-speech matrix. At 314, the parsing component obtains a confidence score. At 316, the parsing component determines whether the confidence score is higher than a threshold to output a syntactic text tree for classification. If so, a complete syntactic text tree is output with each node labeled with its corresponding part-of-speech. If not then the parsing component triggers enhancement by the SVT Utility (908) as described in relation to FIG. 5.

Figure 26:
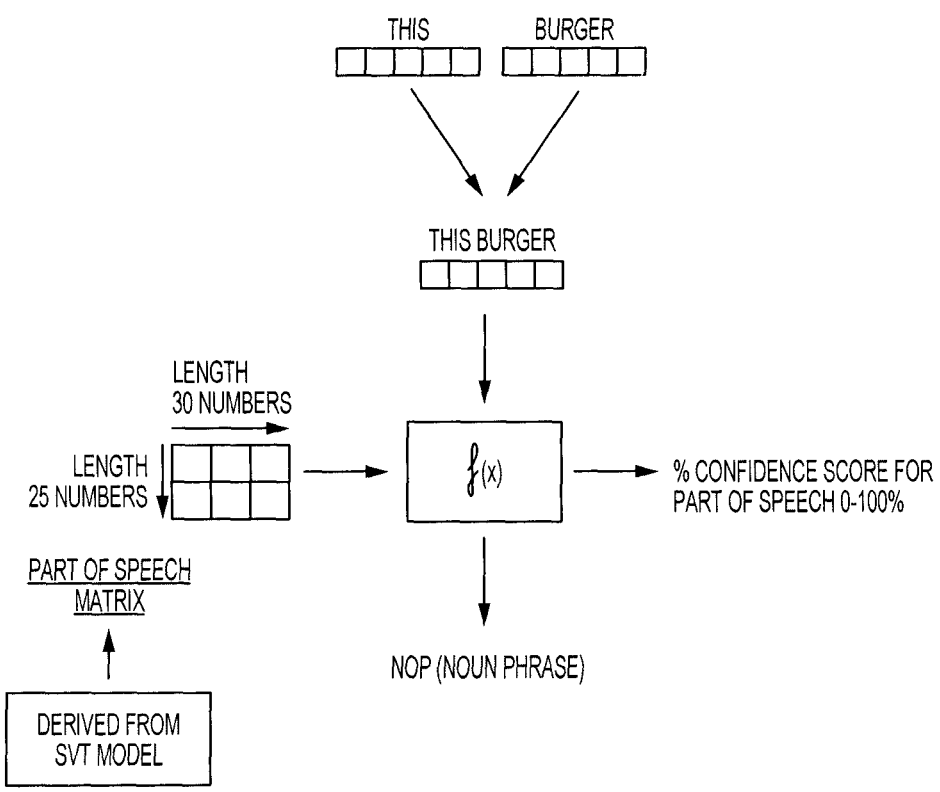

FIG. 26 illustrates a diagram of a confidence score computation for the phrase vector "This burger" from combining the word vector "This" and the word vector "burger".

The part-of-speech for each node is assigned by using the part-of-speech matrix found in the parsing SVT model (of data storage device 1108). A confidence score is generated from the computation of the part-of-speech matrix and the word/phrase vector. A confidence score is a list of values that represents probabilities of how likely each part-of-speech can represent the node. The part-of-speech with the highest probability is assigned to the node. To generate a confidence score, once a new vector is computed from the part-of-speech matrix and phrase vector, a logistic function may be applied to each value and may be converted to a probability by dividing the value by the sum of all the values. A logistic function expresses a value between 0 and 1.

Illustrative and non-limiting examples of part-of-speech may include:
OWC (Open Word Classes)
Adjectives—Adj
Adverbs—Adv
Nouns—Nou
Verbs—Ver
Interjections—Int
CWC (Closed Word Classes)
Auxiliary Verbs—Aux
Clitics—Cli
Coverbs—Coy
Conjunctions—Con
Determiners—Det
Particles—Par
Measure Words—Mea
Adpositions—Adp
Preverbs—Pre
Pronouns—Pro
Contractions—Cot
Cardinal Numbers—Car
PC (Phrase Classes)
Adjective phrase—Adp
Verb phrase—Vep
Noun phrase—Nop
Prepositional phrase—Prp
Infinitive phrase—Inp
Participle phrase—Pap
Gerund phrase—Gep
Absolute phrase—Abp As an illustrative example of the process for assigning a part-of-speech to each node, consider the following textual data elements or string: "I enjoyed my nice warm coffee after walking with her. ☺"

The nodes for word vectors of the syntactic text tree may be assigned a part-of-speech and a confidence score as follows:
I→Pronoun→0.74
Enjoyed→Verb→0.87
My→Pronoun→0.59
Nice→Adjective→0.76
Warm→Adjective→0.88
Coffee→Noun→0.91
After→Conjunction→0.75
Walking→Verb→0.98
With→Preposition→0.68
Her→Pronoun→0.61

The nodes for phrase vectors may be assigned a part-of-speech and a confidence score as follows:

Nice warm coffee→Noun Phrase→0.69
Walking with her→Verb Phrase→0.81

As another illustrative example of the process for assigning a part-of-speech to each node, consider the following textual data elements or string: "This #iPhone app was awful. Never again."

The nodes for word vectors of the syntactic text tree may be assigned a part-of-speech and a confidence score as follows:
This→Pronoun→0.54
IPhone→noun→0.54
app→noun→0.98
was→verb→0.67
awful→adjective→0.87
Never→adverb→0.71
Again→adverb→0.74

Figure 4:
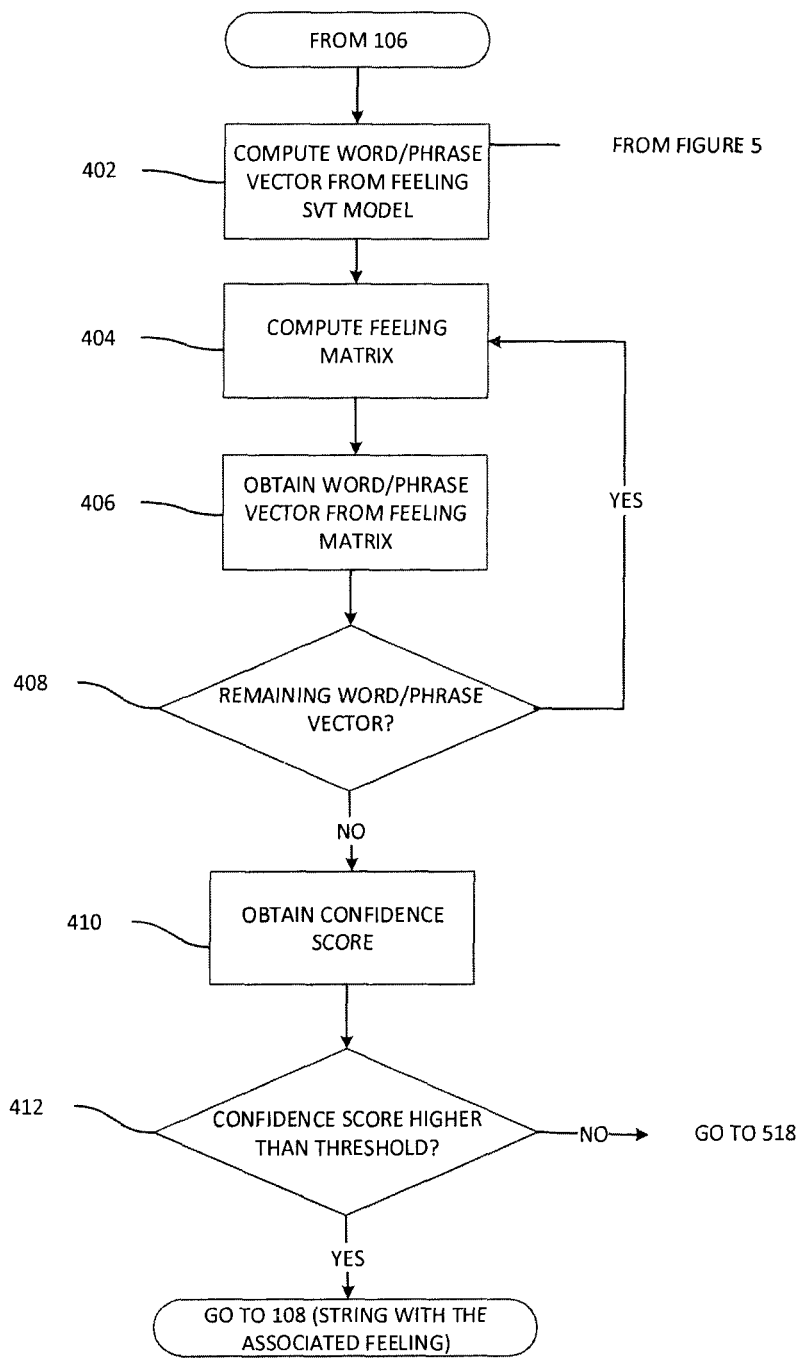
FIG. 4 shows in greater detail that step of classification by the RSR method in accordance with embodiments.

The nodes for phrase vectors may be assigned a part-of-speech and a confidence score as follows:
This #iPhone app→Noun phrase
Was awful→Verb phrase
RSR Technique—Classification RSR Utility (904) is configured with a classification component to process the syntactic text tree and label each node with a corresponding feeling classification. The classification component generates a text string with an associated feeling classification (e.g. FIG. 1 at 106). FIG. 4 provides further details of classification.

Classification is the process of classifying text data elements represented by its syntactic text tree into its associated feeling. This is achieved by propagating through the nodes of the syntactic text tree from top-to-bottom and calculating the feeling as you proceed through each node.

Given a syntactic text tree and a trained feeling SVT model obtained from the techniques described in SVT you can classify the feeling by the following steps.

Figure 27:
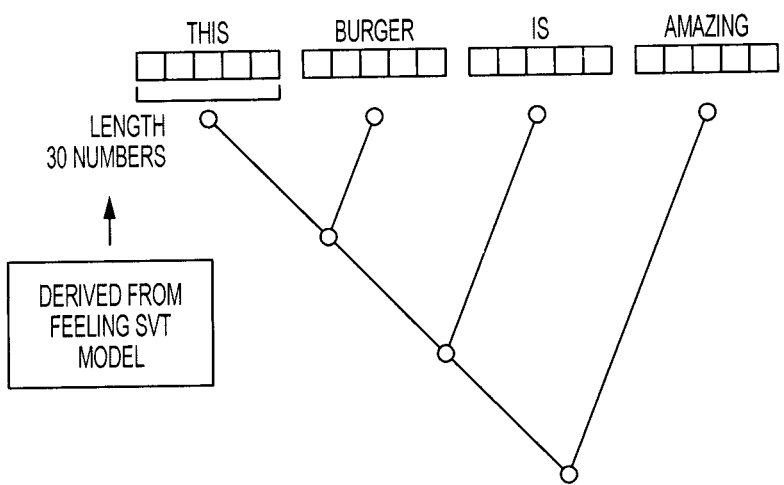
FIGS. 27 to 30 illustrate examples of classification in accordance with embodiments.

At 402, the classification component is configured to obtain each word/phrase vector of the syntactic text tree from the feeling SVT model of the SVT utility (908). An example is shown in FIG. 27.

Given a syntactic text tree with the labeled part-of-speech tags, the corresponding word vector for each word is extracted from the SVT model. For unknown words, an unknown word vector is added which acts as a placeholder if the word vector for the word is not present in the model.

Figure 28:
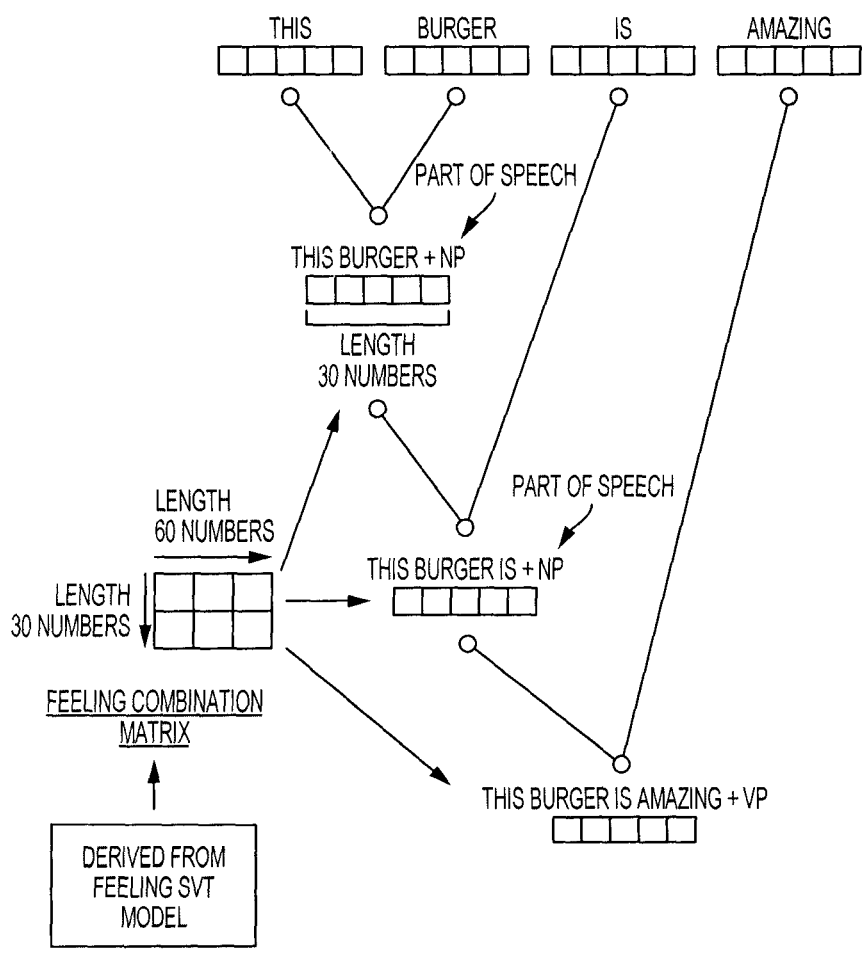

At 404, for each word vector, the classification component computes a feeling matrix, and at 406, the classification component obtains a word vector from the feeling matrix. An illustrative example of a complete syntactic tree is shown in FIG. 28, including the part-of-speech.

Using the values from the feeling combination matrix inside the feeling SVT model, the phrase vector is computed at each parent node by concating the two-bottom child node's word/phrase vector. The phrase vector is a vector of the same representation of a word vector but it is used to represent a combination of words (phrases) instead of a single word.

This process may be similar to classifying and getting the confidence score from the part-of-speech. The classification component may multiply the word/phrase vector pair with the SVT feeling combination matrix to generate a new vector. The classification component may proceed to apply a logistic function to each value of the new vector. To generate the confidence score, each value may be converted to a probability by dividing the value by the sum of all the values. The feeling of the phrase may be determined by the value in the vector with the highest score. A logistic function expresses a value between 0 and 1.

At 408, the classification component determines whether there are any remaining word/phrase vectors of the syntactic text tree for computing. If so, the process repeats step 404 and 406.

Once all the nodes of the syntactic text tree have their related vector calculated, at 410, the classification component obtains a confidence scores.

Figure 29:
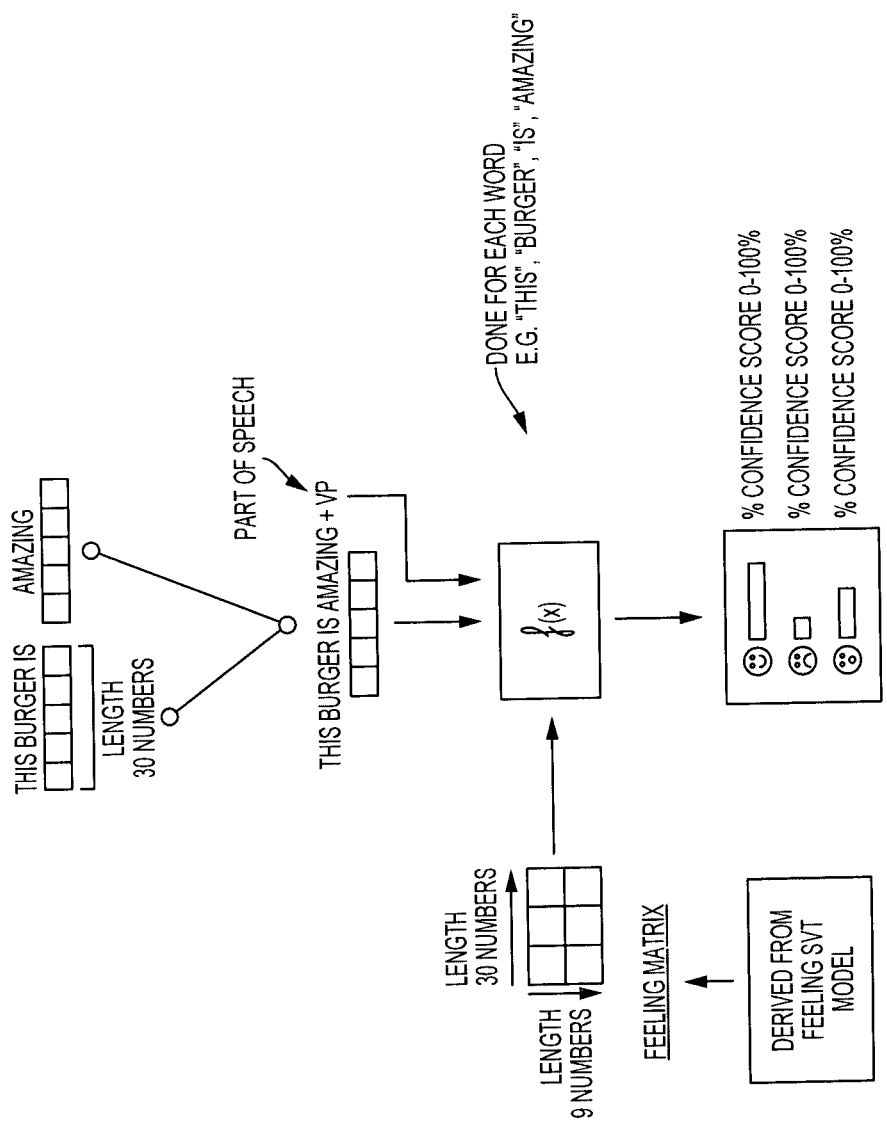

The classification component uses the feeling SVT model's feeling matrix to calculate the confidence score of each feeling by multiplying the phrase vector of the top node and the part-of-speech tag by the feeling matrix and passing the value through the feeling SVT model's computation function. An illustrative example is shown in FIG. 29.

Figure 30:
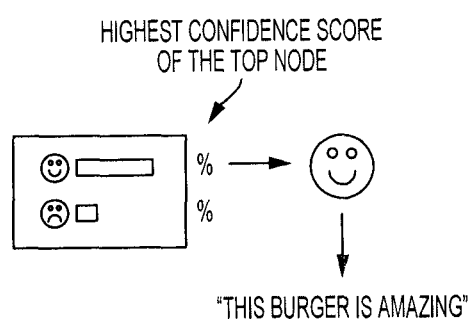

Given the confidence score generates a probability value for each feeling in between 0 and 1, the feeling with the highest probability is assigned as being the most probable feeling that expresses the text. This feeling may be used for the feeling classification responses. An illustrative example is shown in FIG. 30.

As a further example:
Angry→0.76
Sad→0.11
Happy→0.13

Angry is the dominant as it has the highest probability

Figure 31:
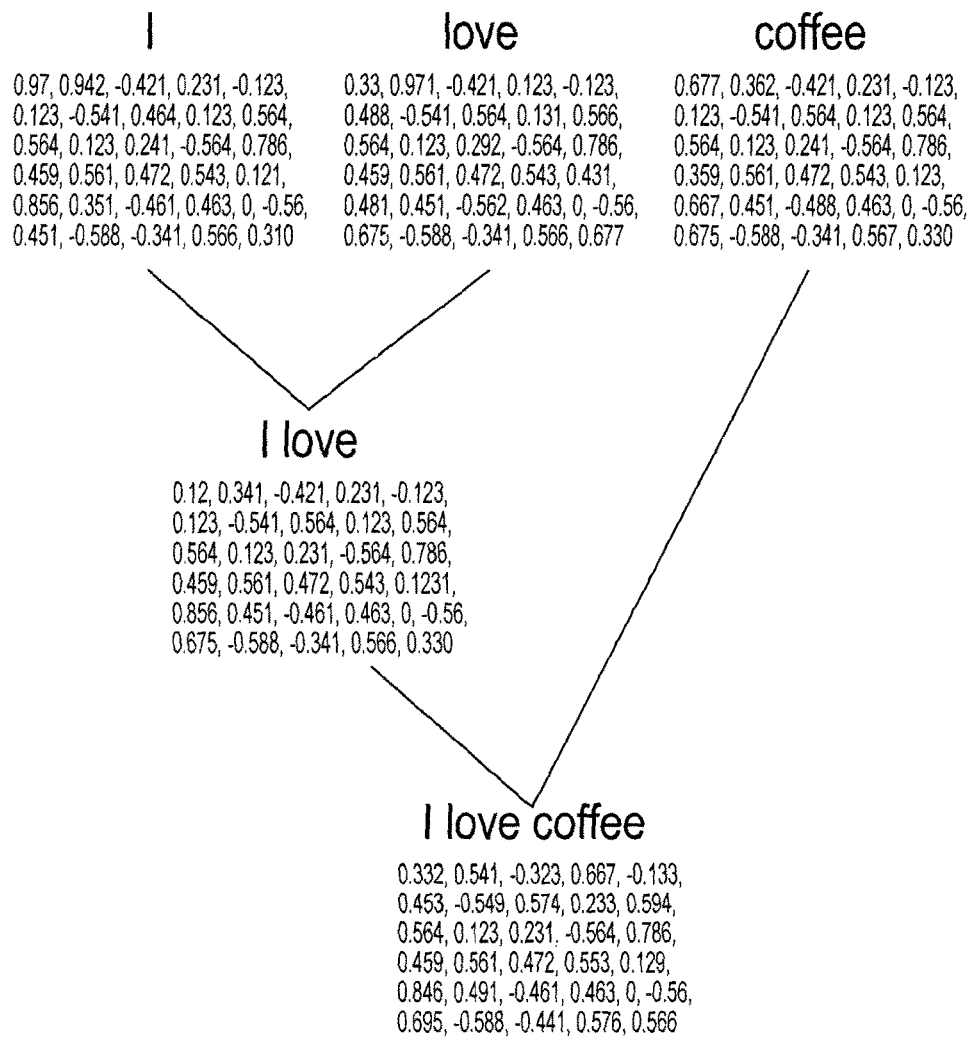
FIG. 31 illustrates an example of a tree with different weights in accordance with embodiments.

FIG. 31 illustrates an example of a syntactic tree with different vector values for the phrase "I love coffee". The syntactic tree is shown with both phrase and word vectors and corresponding vector values.

At 412, the classification component determines whether the confidence score is higher than a threshold to output a text string with associated feeling. If so, the classification component outputs a string with associated feeling. If not, the classification component triggers enhancement by the SVT Utility (908) as described in relation to FIG. 5.

As an illustrative example, the following feelings may be used by the classification component to label each note of the tree.
Feelings
Neutral—Neu
Happy—Hap
Loved—Lov
Excited—Exc
Hopeful—Hop
Scared—Sca
Sad—Sad
Horrible—Hor
Angry—Ang These are non-limiting examples for illustrative purposes.
The following example confidence scores may range from 0 to 100.
Confidence Score
Neu 0-100
Hap 0-100
Ang 0-100

The following provides illustrative and non-limiting examples of labeled sentences showing the syntactic text tree from parsing component converted by the classification component to a text string with associated feelings.
(Ang (Neu entity) (Neu (Neu why) (Neu (Neu you) (Neu (Neu do) (Neu (Neu this) (Neu ?!?!))))))
(Ang (Ang (Neu where) (Ang (Neu the) (Neu f*))) (Neu (Neu (Neu is) (Neu (Neu the) (Neu entity))) (Neu ?)))
(Hor (Neu (Neu this) (Neu entity)) (Hor (Hor (Neu smells) (Hor horrible)) (Neu !)))

Figure 5:
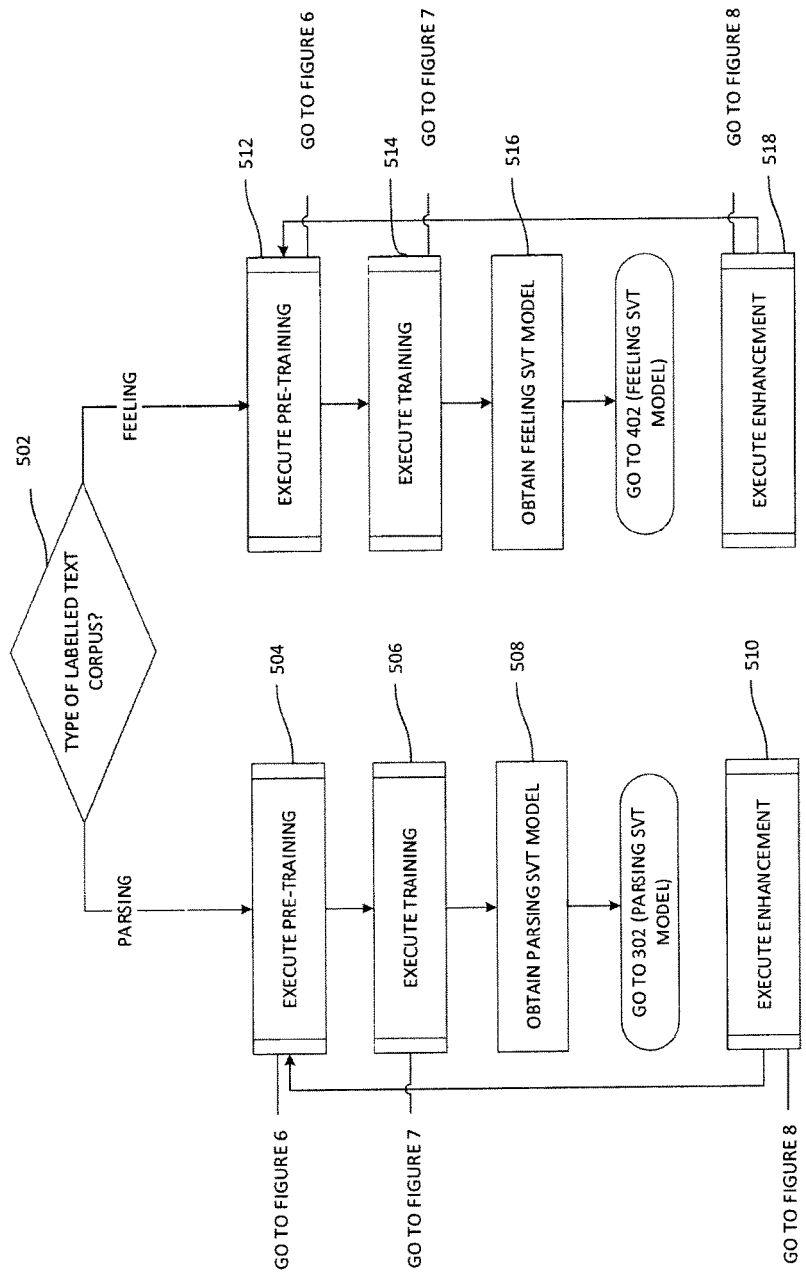
FIG. 5 depicts an overview of a computer system implemented method for a Sentence Vectorization Technique (SVT) in accordance with embodiments.

SVT
FIG. 5 illustrates an example process implemented by SVT utility (908).

At 502, SVT utility (908) determines whether the type of labelled text corpus (916) is parsing or feeling.

Figure 6:
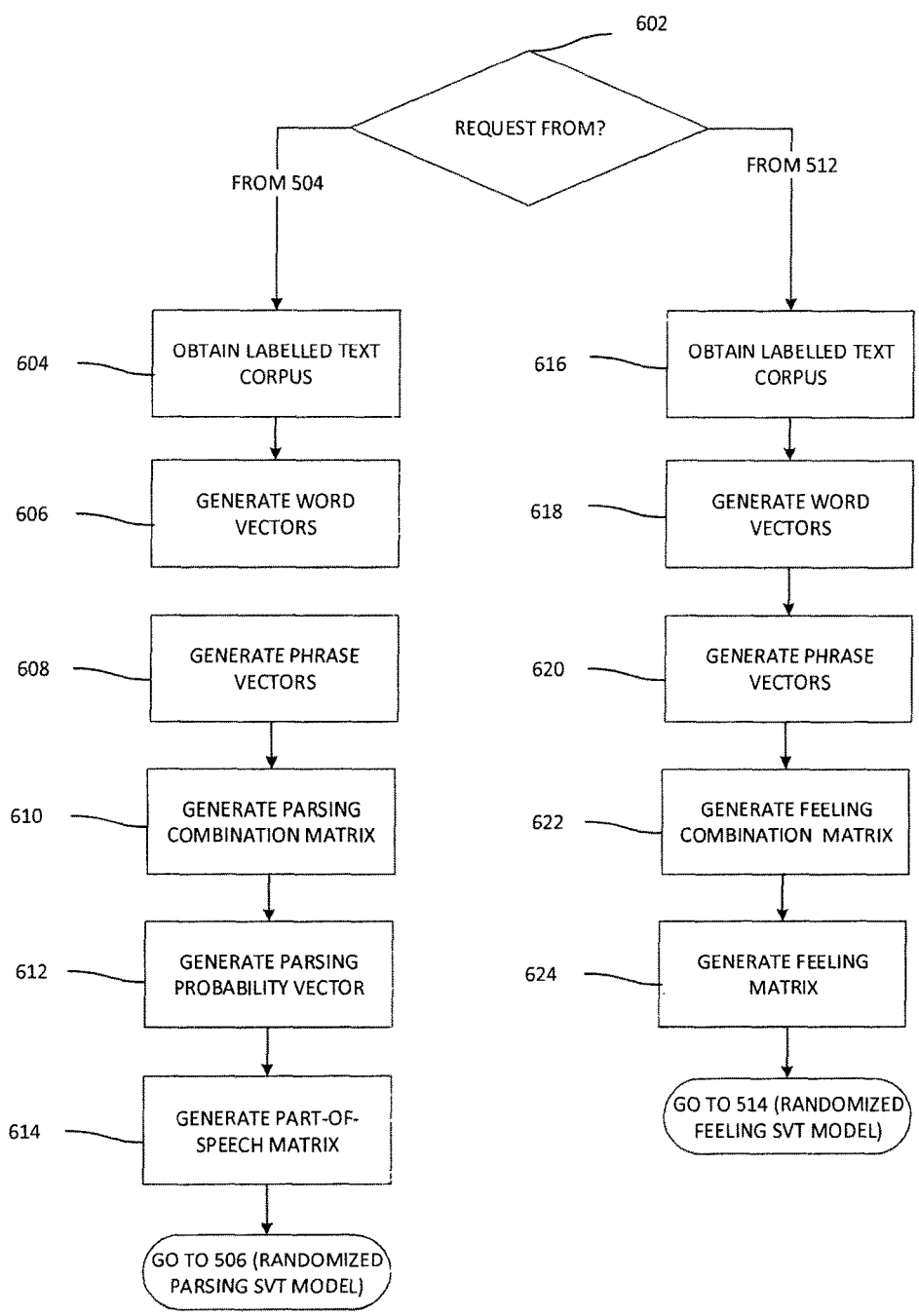
FIG. 6 shows in greater detail the step of pre-training by the SVT method in accordance with embodiments.

At 504 and 512, SVT utility (908) executes pre-training. FIG. 6 illustrates details of pre-training.

The pre-training process loads and sets up a SVT model to be trained by a labeled text corpus. The SVT model holds the vector and matrices that are used to express the words and the semantic relationship of a string of text. You use a separate SVT model for parsing and for feeling classification. The model used for parsing is known as the parsing SVT model and the model used for classification is known as the feeling SVT model. The labeled text corpus is a large set of labeled syntactic text trees that expresses the feeling and part of speech of each tree node.

At 604 and 616, the labeled text corpus is loaded into the SVT model.

At 606 and 618, the SVT utility (908) generates a list of randomize vectors for each unique word in the labeled text corpus. The length of the vector is expressed as 'd'. These vectors are known as word vectors.

At 608 and 620, the SVT utility (908) generates phrases vectors by combining word vectors.

At 610 and 622, the SVT utility (908) creates a matrix of size (2d×d) that expresses how to combine a pair of either WORD or phrase vectors to express longer phrases. It's used in the process of producing a phrase vector which represents a phrase. This process is known as phrase combination and the matrix is known generally as the combination matrix. In the feeling SVT model, the matrix is known as the feeling combination matrix and in the parsing SVT model, the matrix is known as the parsing combination matrix.

If the SVT model is for parsing, at 612, the SVT utility (908) creates a parsing probability vector of length (d), which is used to determine the probability of the phrase vector during parsing.

If the SVT model is used to classify the feeling, at 624, the SVT model creates a matrix of size (c×d) where 'c' is the amount of individual feelings. This vector expresses how to classify a word/phrase vector into a feeling. This is known as the feeling matrix.

If the SVT MODEL is used for parsing, at 614, the SVT model creates a matrix of size (a×d) where 'a' is the amount of individual part-of-speech tags. This matrix expresses how to classify a word/phrase vector into a particular speech tag. This is known as the part-of-speech matrix.

The values in all the vectors and matrices are randomized.

Figure 7:
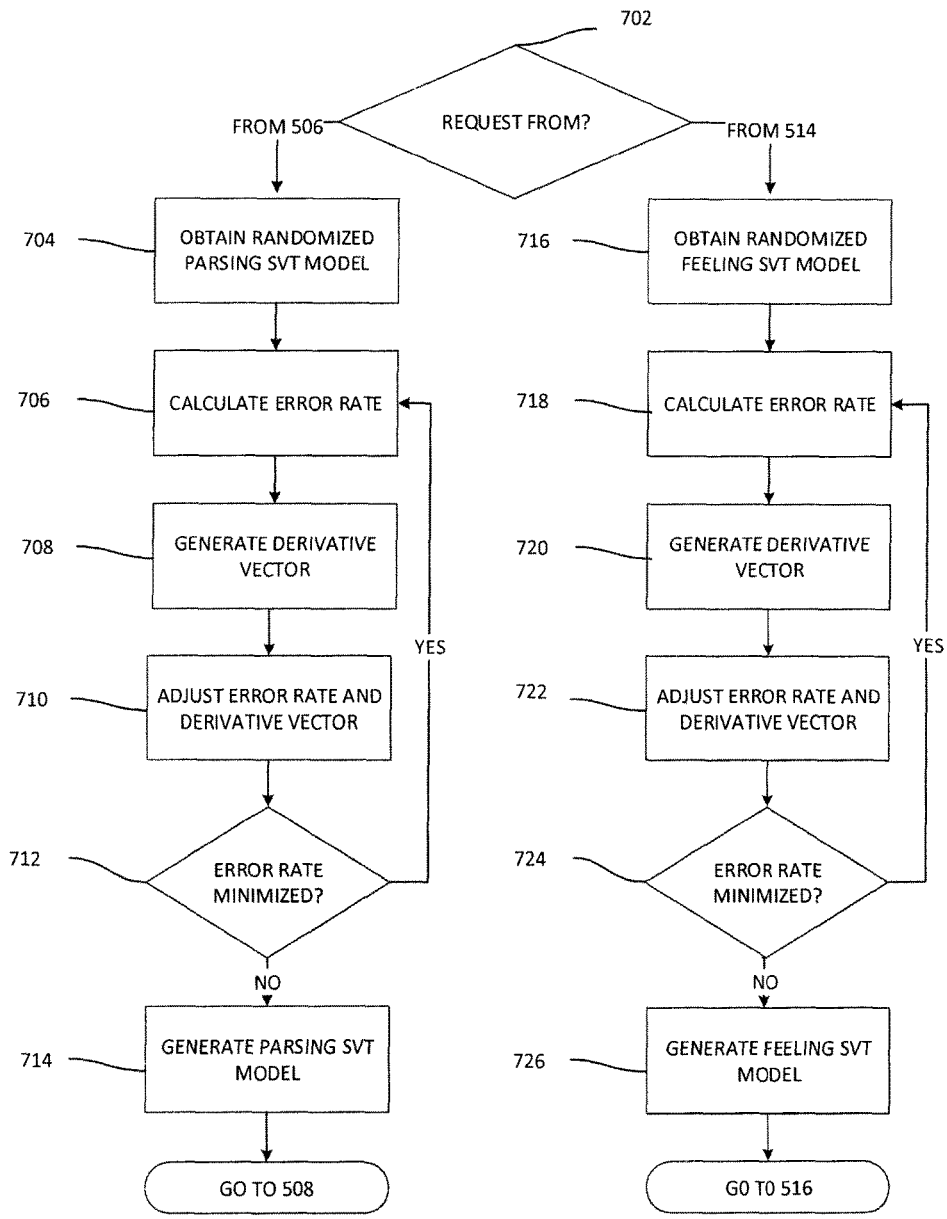
FIG. 7 shows in greater detail the step of training by the SVT method in accordance with embodiments.

Referring back to FIG. 5, at 506 and 514, the SVT utility (908) executes training. Details of the training process are shown in FIG. 7.

The training process involves learning the feature representation for each word, feeling, part-of-speech and phrase combination. SVT utility (908) gradually adjusts the values in the SVT model by comparing the error difference present in the model and the labeled text corpus.

At 702, the SVT utility (908) determines whether the request is from the parsing component or the classification component. At 704 and 716, the SVT utility (908) obtains the randomized SVT models from pre-training.

The training process may involve by splitting the labeled text corpus into small individual sets. Each single set is known as a batch.

At 706 and 718, SVT utility (908) proceeds to calculate the error rate of each vector at each node of the tree from the bottom of the tree to the top. The error rate expresses how far off the vectors are in the SVT model from correctly classifying the feeling and/or part-of-speech.

The error rate may be calculated by taking the confidence score of the vector, subtracting one from the probability of the correct class and inversing the sum of the logarithm of each value in the confidence score. The error rate is expressed as a float number.

As an illustrative example, given this confidence score of a vector:

Angry→0.30
Happy→0.13
Sad→0.44

If the correct class is 'Angry' then the error rate may expressed as:

Error rate=−1*sum(log(Angry−1)+log(Happy)+log(Sad))

At 708 and 720, the error rate from the entire tree nodes are summed and expressed in a derivative vector. The derivative vector represents the original as the derivative of each of its values. It's the same length as the original vector format. The derivative vector expresses the direction the values inside the vector need to be adjusted to properly classify the correct feeling.

At 710 and 722, the collective derivative vector from the trees in the batch proceeds to be regularized and scaled if needed. Regularizing allows the derivative vector to affect the different vector and matrix types differently by multiplying a constant value that represents each type. Scaling helps to update feeling values that show weaker features in the model to reflect a larger feature input.

The adjusted derivative vector is then used to lightly adjust the matrix and vector values inside the SVT model. This is so the model gradually learns over time.

This entire process is repeated until the overall error rate is minimized as determined at 712 and 724.

Once the error rate is minimized, at 714 and 726, a SVT model is produced and can be used for feeling classification as well as parsing (e.g. FIG. 5 at 508 and 516)

Figure 8:
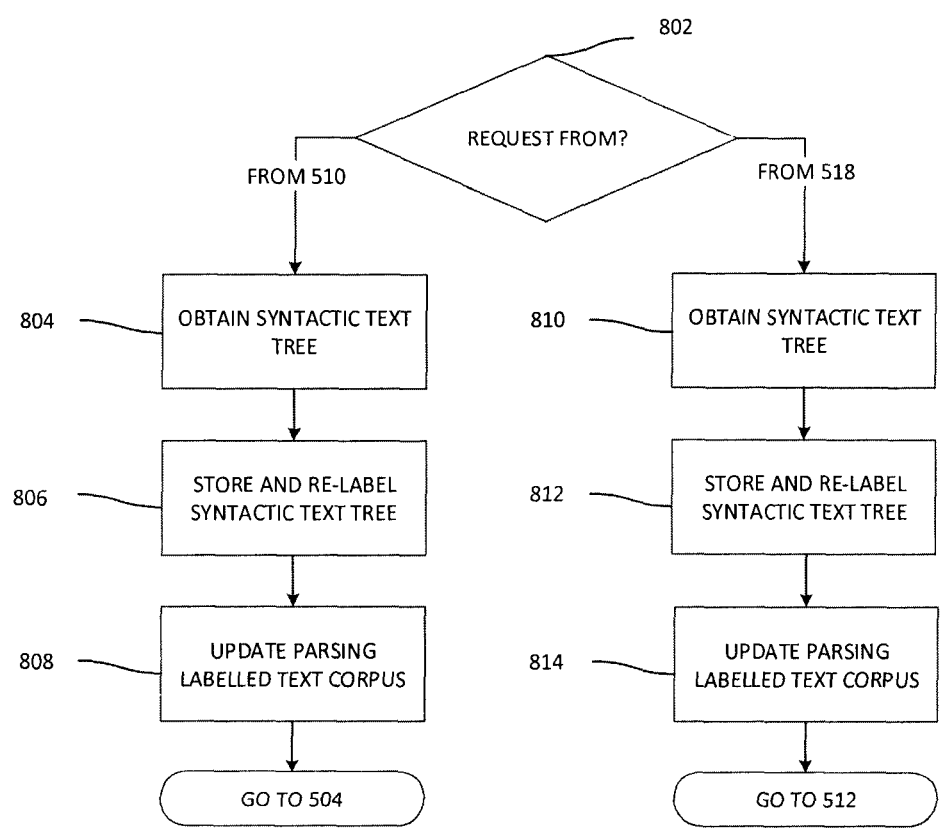
FIG. 8 shows in greater detail the step of enhancement by the SVT method in accordance with embodiments.

As shown in FIG. 5, the SVT utility (908) may execute enhancement at 510 and 518. Further details are shown in FIG. 8.

To continuingly improve on the parsing and feeling SVT model after training has been accomplished we developed a method that discovers and fixes the classification of new textual data not seen in the labeled text corpus. This method is described for each of parsing and feeling SVT model:

After each classification of the part-of-speech and feeling on new textual data the confidence score for each of the assigned class is given.

At 804 and 810 SVT utility (908) obtains the syntactic text tree.

If the value in the confidence score is lower than a confidence threshold; the syntactic text tree is regarded as not being able to be classified with a high degree of confidence from our SVT model. The confidence threshold is a value between 0 and 100 that the value from the confidence score must be greater than to show it was classified with a high degree of confidence.

If the statement above about the syntactic text tree is true. At 806 and 812, the tree is then stored, relabeled and, at 808 and 814, added to the labeled textual corpus.

The SVT model is regenerating by going through the pre-training and training process while being trained with the new labeled textual corpus.

Given that the SVT model now has learned how to properly classify the syntactic text tree, in the future the correct classification with a high degree of confidence may be assigned to it. Thus, the accuracy will improve gradually as more classification is done.

As part of RSR, in one possible implementation, the classifier may split the text data elements into an array or vector of words or may generate tokenized data for analysis.

Referring now to FIG. 2, there is shown certain aspects of an aspect of the method of FIG. 1, namely the RSR technology implemented by embodiments described herein.

Accordingly, the computer platform may include functionality that enables the return of a feeling classification if the text data elements are synonyms to a previously classified set of text data elements using word and phrase vectors. This function may be provided by synonym substitution that is linked to or made part of the text analysis engine (906). One of the attributes of the synonym substitution includes the ability to better handle text that are textually different than what appears currently in the model but the underlying semantics of it has been evaluated before. An illustrative example involving this component may include evaluating these but not limited to words in our model; 'good', 'great', 'outstanding', 'fantastic' and 'amazing'. Given these words are completely different from each other both in spelling and characters, the underlying semantics have most-likely been seen before if one of the words were analyzed before. This in turn, may make sure the semantics takes present in determining the place the particular word has in the textual data. This component is important to accurately deal with words that have not been computed before.

The RSR component may implement one or more a supervised machine learning methods in order to determine the part-of-speech of each word, i.e. whether it is a noun, verb, adjective or adverb. The RSR technique implemented by the computer platform may also use the data storage device and its records including various classified sentences that operate as training sets. The data storage device may also be supplemented by other resources such as electronic dictionaries and catalogues such as WIKIPEDIA™.

As another example, the parsing component may process the text data elements "amazing first goal for Manchester!!" will include the words goal and Manchester. Which will be in reference to the soccer term and the soccer team. The parsing component of the embodiments described herein may determine the parts of speech for each word, i.e. amazing(adjective) first(adjective) goal(noun) for(preposition) Manchester(proper noun). Example parts of speech may be:

amod(goal-3, amazing-1)
amod(goal-3, first-2)
root(ROOT-0, goal-3)
prep(goal-3, for-4)
nn(!!-6, Manchester-5)
pobj(for-4, !!-6)
(ROOT (NP
   (NP (JJ amazing) (JJ first) (NN goal))
   (PP (IN for)
   (NP (NNP Manchester) (NNP !!)))))

As illustrated in the example above, numbers may be assigned to the feeling, and the feeling records may be encoded with information that determine the dependencies between feelings, these dependencies defining feeling groupings. These dependencies enable the encoding of text data elements with information that may be analyzed to reveal patterns between text data elements that have related feeling attributes. This encoding using dependencies further enables the use of pattern recognition.

In one aspect of embodiments described herein, the computer system may be configured in a way that enables rapid processing of large volumes of text data. As illustrated in FIGS. 9 and 11, the RSR utility and the SVT utility are linked to one another so as to enable the components to communicate with one another and interoperate in processing text data elements in real time (e.g. through the text analytics engine (906)). This aspect allows the rapid processing of large amounts of data.

In another possible aspect of the implementation of the embodiments described herein, the server processor (1100) may be configured so that it does not store all data, and accesses additional data through external recourses persistently storing the data, for example. The API allows client devices (1106) to connect directly to server processor (1100) and supply text data elements, and obtain the results of feeling analysis processes by the computer network service in real time or near real time.

Possible Implementation

In accordance with an aspect of the embodiments described herein, there may be provided a computer network implemented system for providing a computer network service based on analysis of text data elements, to determine one or more associated feelings. The component network may interconnect various physical, tangible hardware components that implement the techniques and features described herein.

The computer network implemented system may include one or more server computers linked to the Internet, and enabling one or more computer implemented utilities providing a two part computer architecture that includes a first utility implementing the described RSR technique, and a second utility implementing the described SVT technique.

It will be appreciated that any module or component exemplified herein that executes instructions may include or otherwise have access to computer readable media such as storage media, computer storage media, or data storage devices (removable and/or non-removable) such as, for example, magnetic disks, optical disks, tape, and other forms of computer readable media. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD), blue-ray disks, or other optical storage, magnetic cassettes, magnetic tape, magnetic disk storage or other magnetic storage devices, or any other medium which can be used to store the desired information and which can be accessed by an application, module, or both. Any such computer storage media may be part of the mobile device, tracking module, object tracking application, etc., or accessible or connectable thereto. Any application or module herein described may be implemented using computer readable/executable instructions that may be stored or otherwise held by such computer readable media.

Thus, alterations, modifications and variations can be effected to the particular embodiments.

Figure 10:
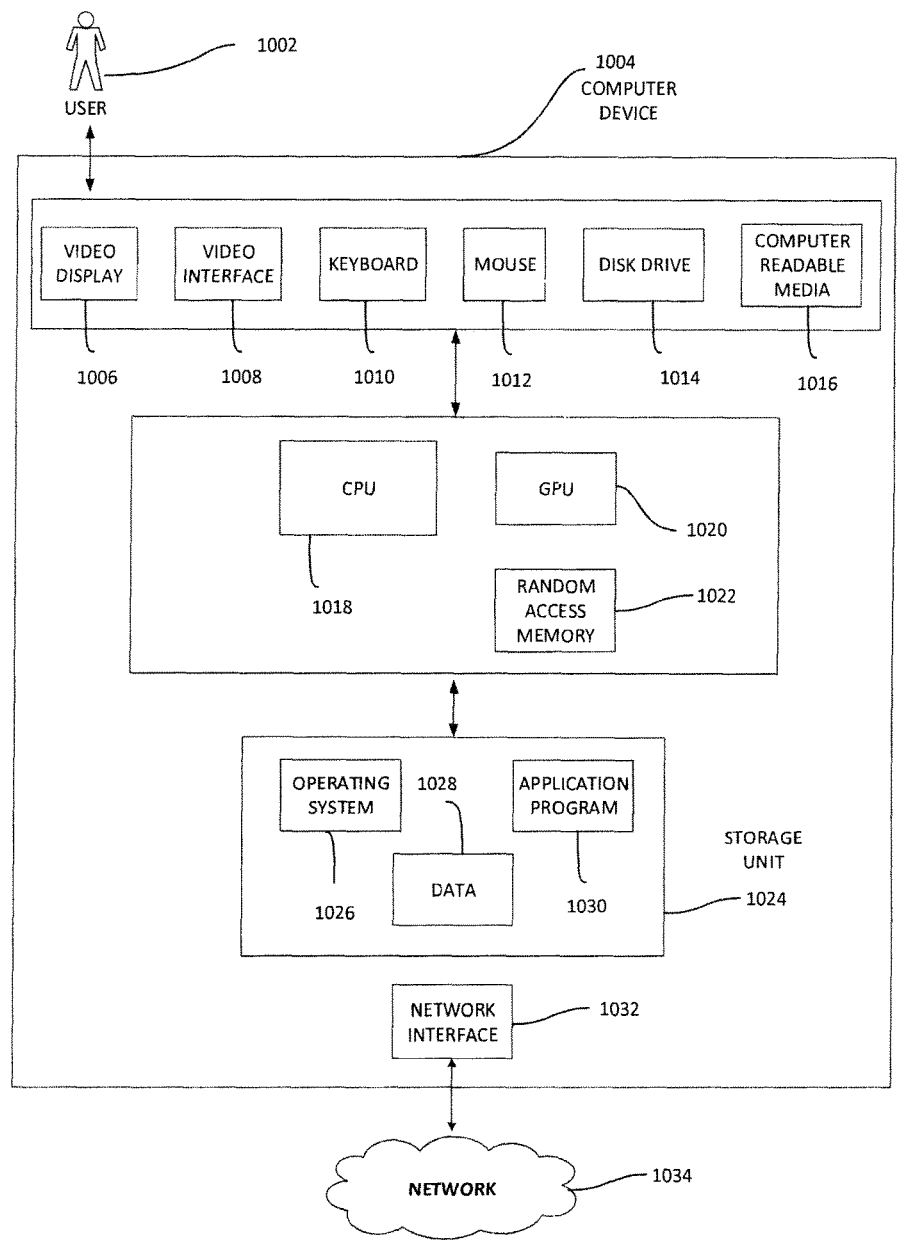
FIG. 10 depicts a computer system for executing the method for determining feeling in text in accordance with embodiments.

The embodiments described herein may be practiced in various embodiments. A suitably configured computer device, and associated communications networks, devices, software and firmware may provide a platform for enabling one or more embodiments as described above. By way of example, FIG. 10 shows a computer device 1004 that may include a central processing unit ("CPU") 1018 connected to a storage unit 1024 and to a random access memory 1022. The CPU 1018 may process an operating system 1026, application program 1030, and data 1028. The operating system 1026, application program 1030, and data 1028 may be stored in storage unit 1024 and loaded into memory 1016, as may be required. Computer device 1004 may further include a graphics processing unit (GPU) 1020 which is operatively connected to CPU 1018 and to memory 1022 to offload intensive image processing calculations from CPU 1018 and run these calculations in parallel with CPU 1018. An operator 1002 may interact with the computer device 1004 using a video display 1006 connected by a video interface 1008, and various input/output devices such as a keyboard 1010, mouse 1012, and disk drive or solid state drive 1014 connected by an I/O interface 1008. The mouse 1012 may be configured to control movement of a cursor in the video display 1006, and to operate various graphical user interface (GUI) controls appearing in the video display 1008 with a mouse button. The disk drive or solid state drive 1014 may be configured to accept computer readable media 1016. The computer device 1004 may form part of a network via a network interface, allowing the computer device 1004 to communicate with other suitably configured data processing systems (not shown). Computer device 1004 may be used to implement various components shown in FIGS. 9 and 11 or otherwise described herein, for example.

Embodiments described herein may generate and transmit user interfaces for display on a display screen or device. An example application for embodiments described herein may be marketing for goods and services. Embodiments described herein may leverage social media platforms for the marketing application.

Consumers have integrated social media into their daily lives and may be expressing feelings of their favourite brands within their social media conversations in real time. This wields enormous influence in shaping the opinions of other consumers within their networks.

Embodiments described herein may use computer processing techniques to automatically interpret these feelings on massive amounts of user generated text. Embodiments described herein may use the techniques described herein for automatic detection of feelings within text in real-time. This may be a useful preprocessing step in advertising and marketing. This may enable brands to quantatively measure a consumers emotional connection and return on involvement with their favourite brands from real-time conversations on the social web.

Embodiments described herein may automatically process textual conversations on the social web in real-time and provides the feelings of the textual data. Embodiments described herein may analyze different feelings detected on social media platforms.

The text analysis engine (906) may also be applied across multiple verticals.

As an example, text analysis engine (906) may implement a cloud based artificially intelligent personal assistant that leverages the text analysis engine (906) to power its recommendation engine based on the conversations of consumers and their feelings towards topics within an individuals network on their social media platforms.

Another example application is the financial industry, for trading a stock and monitoring its performance based on a consumers feeling towards topics around but not limited to the stock, company or industry across different social media platforms.

A further example application is for social and not-for-profit causes such as reporting physical abuse, suicide prevention, bullying etc. via the text analysis engine's ability to detect a consumers feeling towards topics across multiple social media platforms.

Another example application is for reporting and monitoring elections for political parties and its candidates by detecting a consumer's feelings across social media platforms towards topics of interest.

FIG. 12 illustrates a display screen providing a user interface for defining campaign settings for an advertising application. This example may relate to feeling analysis for a brand by measuring a return on involvement of consumers on social media platforms in real-time based on feeling classification of text on such social media platforms relating to the brand.

The user interface may include a field for receiving a name for the campaign, and may also receive other data such as a brand related to a good or service, as well as keywords or filters to apply to text (e.g. words, phrases) on social media platforms to flag for feeling analysis. The user interface may be used by an account manager for a given brand, for example.

Figure 13:
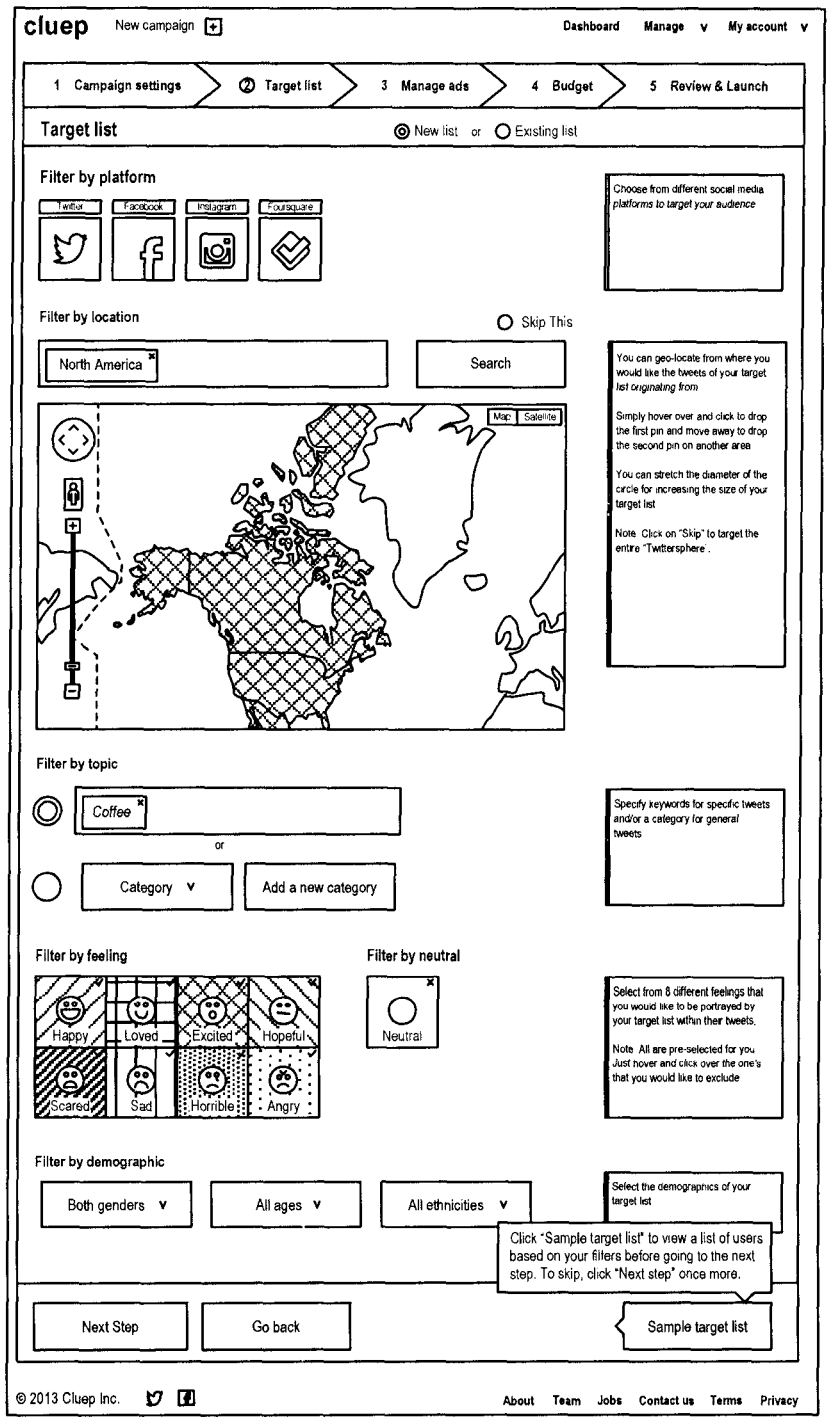
FIG. 13 illustrates a display screen providing a user interface for defining campaign target for an advertising application.

FIG. 13 illustrates a display screen providing a user interface for defining campaign target for an advertising application. The interface includes a target list and mapping tools for defining a geographic area. The user interface may enable selection of a particular geographic region for text analysis. The text may be associated with users from different geographic areas. Only users and text associated with the selected geographic area may be used for the feeling analysis or classification. Example filters include topic and feeling.

Figure 14:
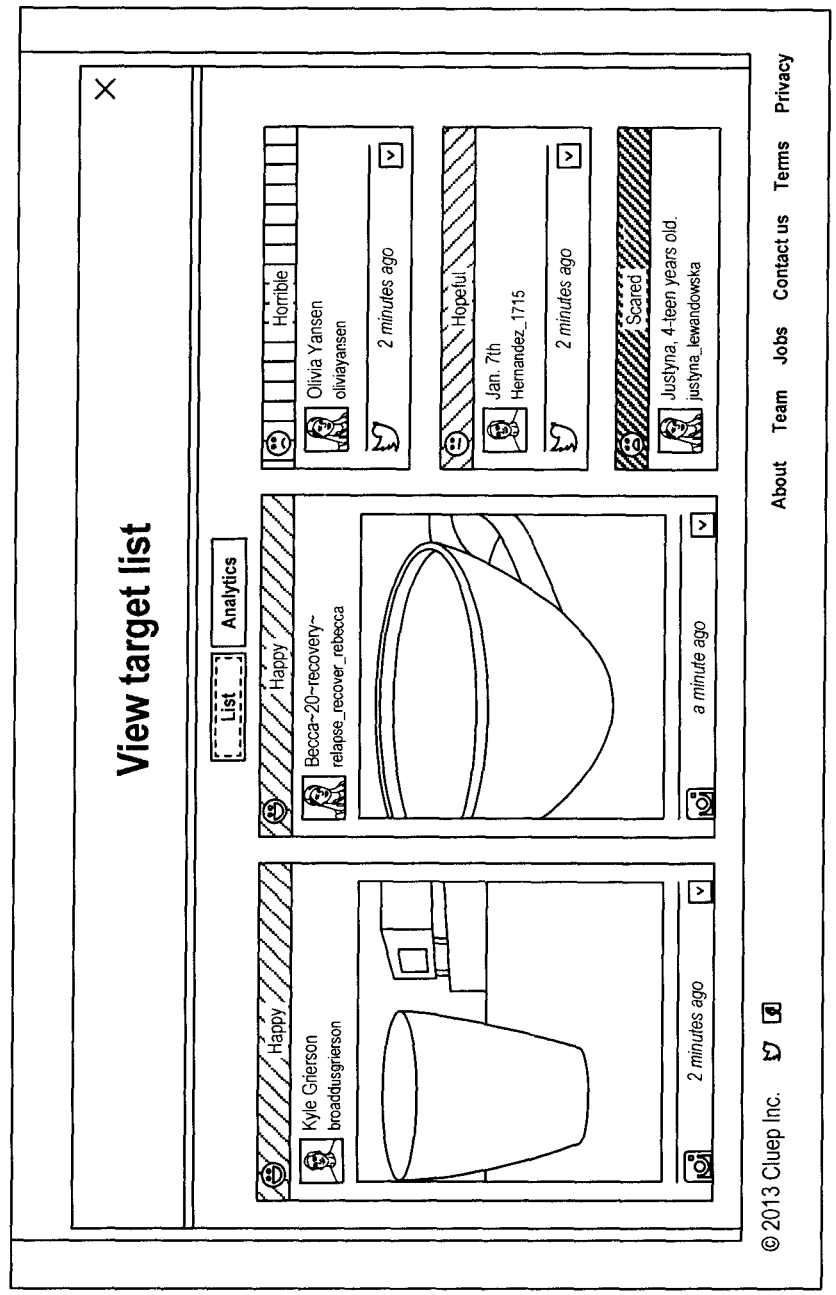
FIGS. 14 to 16 illustrate a display screen providing a user interface for defining a target list for an advertising application.
Figure 15:
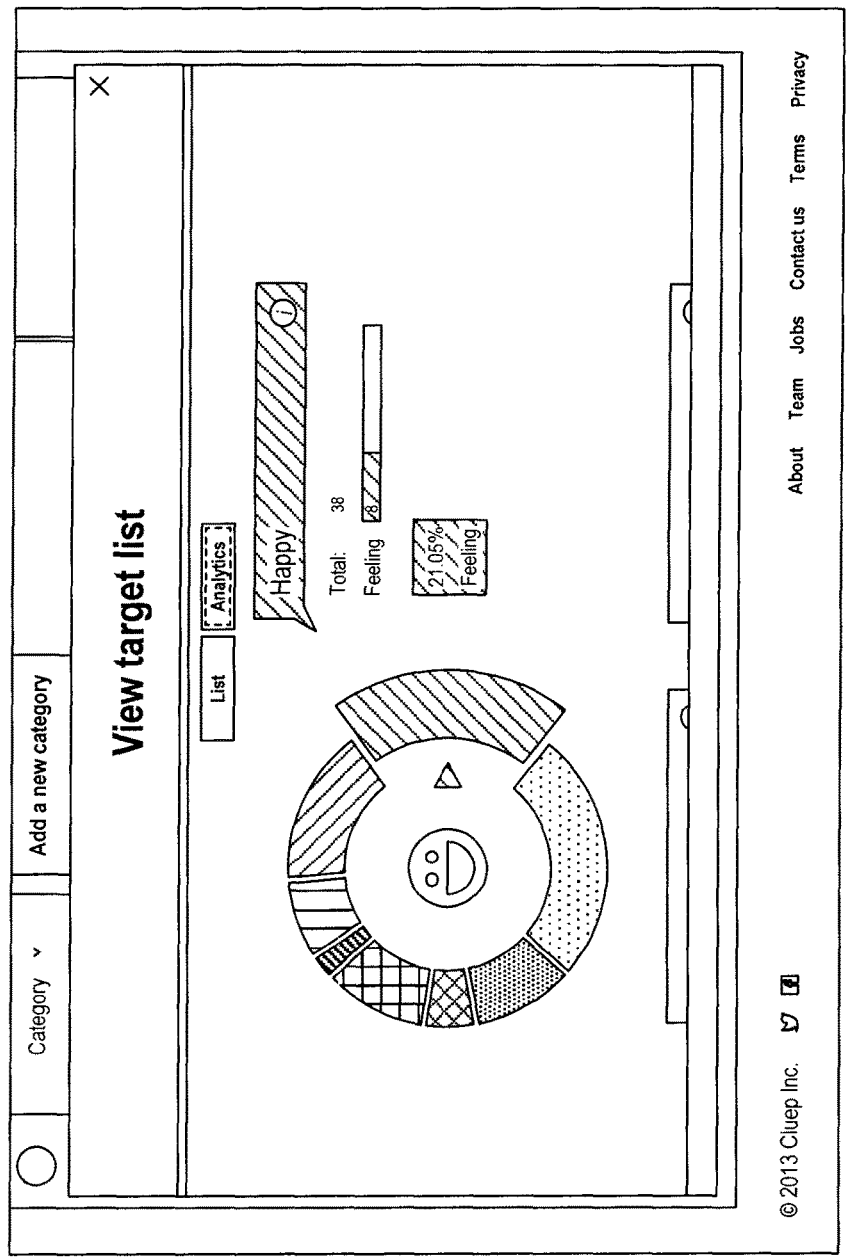
Figure 16:
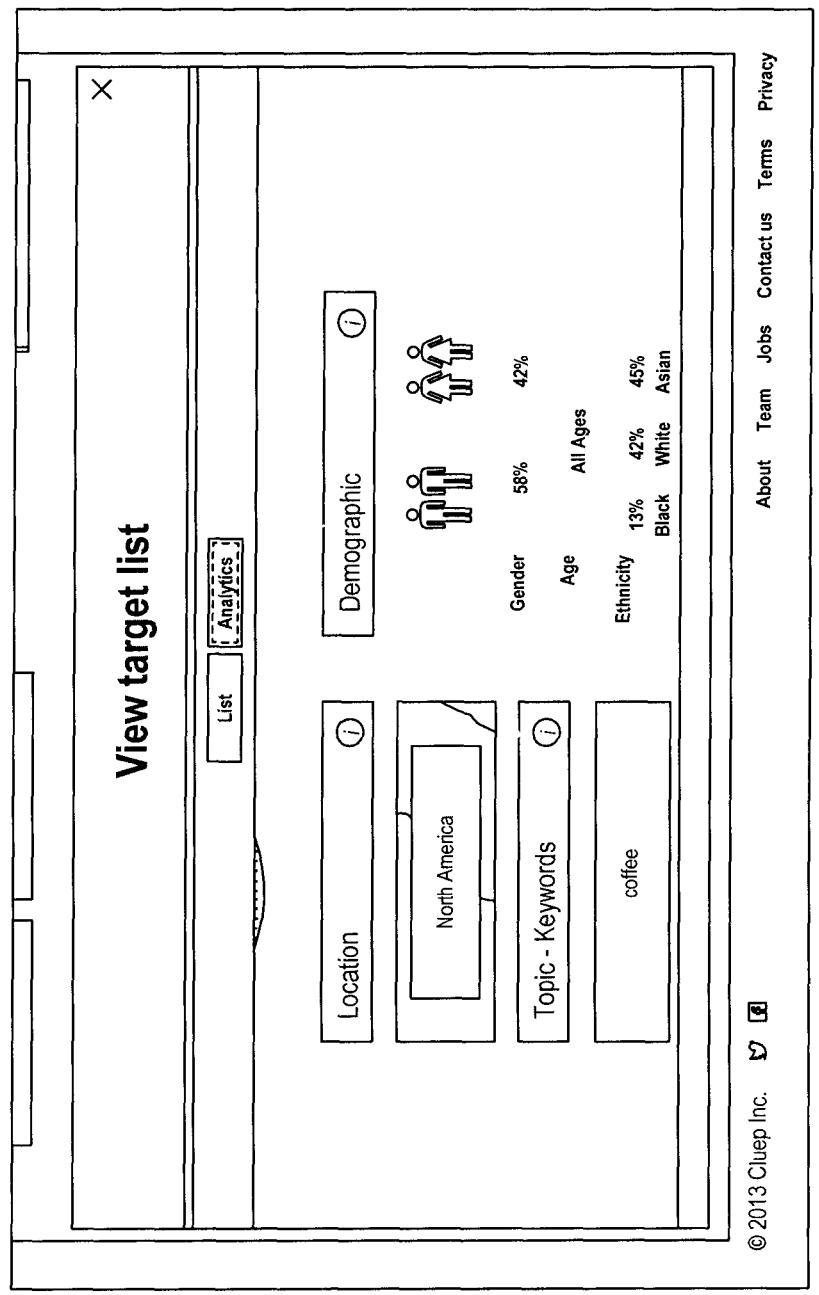

FIGS. 14 to 16 illustrate a display screen providing a user interface for defining a target list for an advertising application. The user interface provides example social media text and content for different users associated with classified feelings. The user interface may also be configured for providing analytic results. The user interface may provide analytic results in various visual forms, such as bar charts, graphs, aggregated data sets, and so on, with annotations for example. The result data may be exported and transmitted to different systems for further processing. The results relate to processing of social media text with regard to the feeling selected. Different social media users may also be displayed. The target for obtaining text data elements for processing may be identified using various factors, such as location and demographic.

Figure 17:
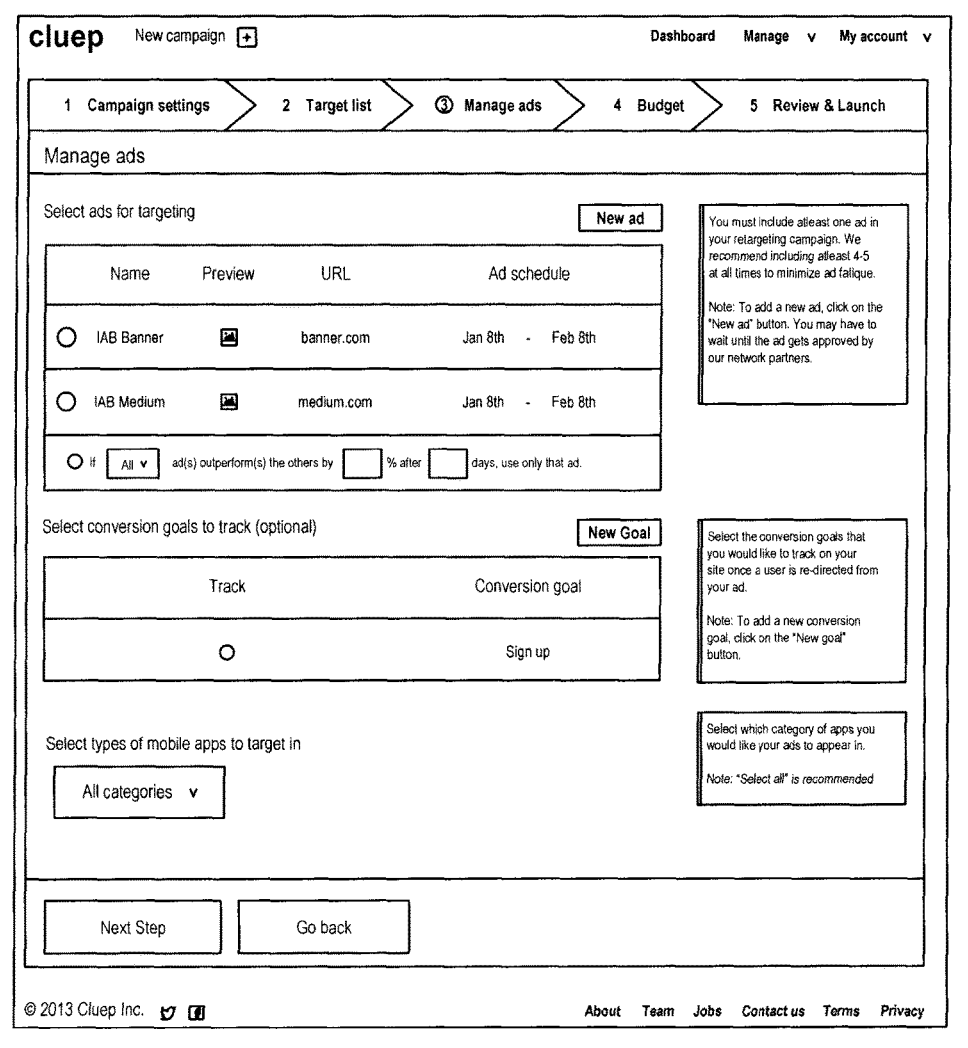

FIG. 17 illustrates a display screen providing a user interface for managing advertisements for an advertising application. Text relating to the advertisements may be processed for feeling classification in some examples.

Figure 18:
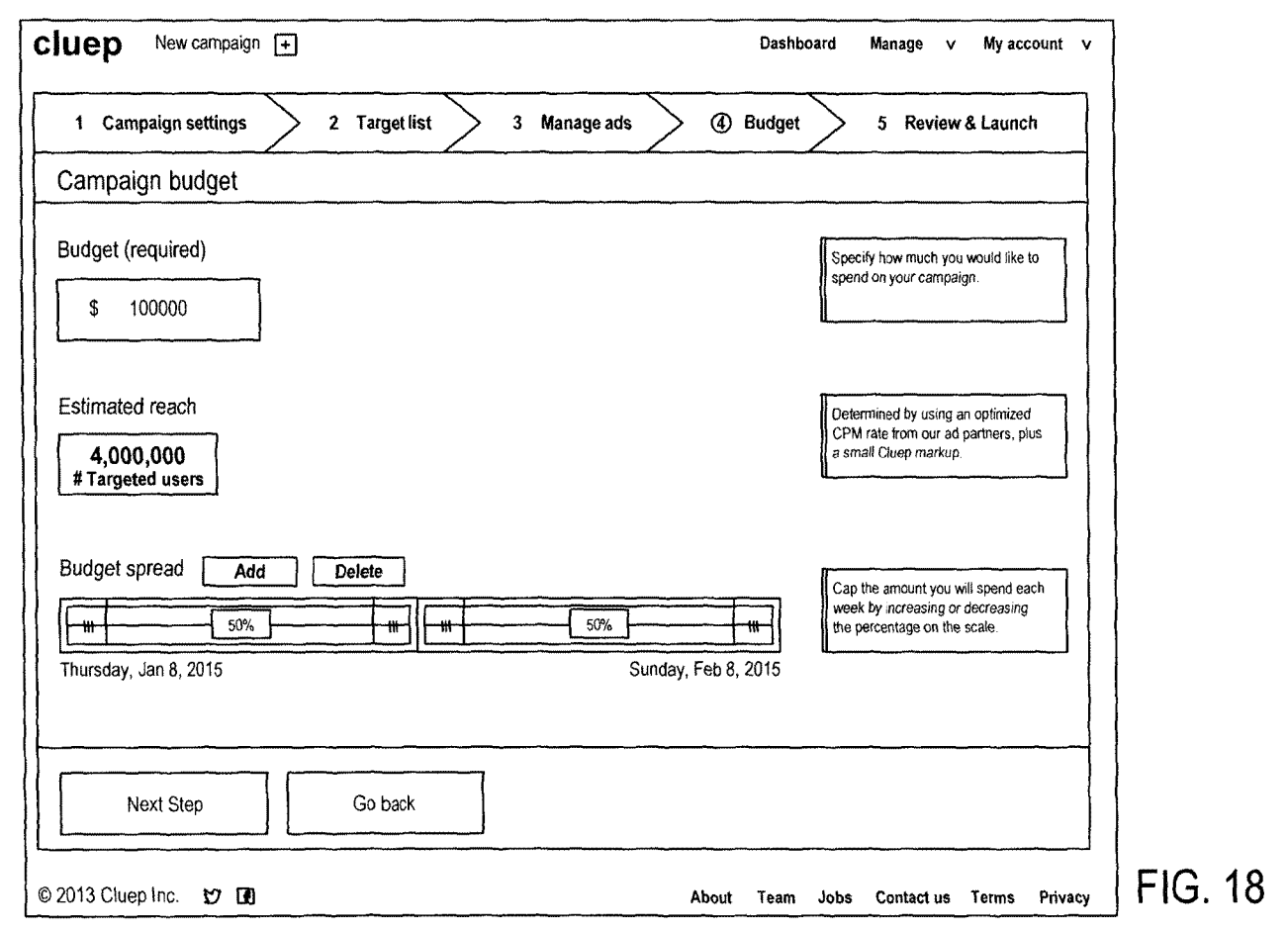

FIG. 18 illustrates a display screen providing a user interface for defining a budget for an advertising application to track usage of service by third party advertisers. There may be a cost associated with processing and classification services.

Figure 19:
FIG. 19 illustrates a display screen providing a user interface for reviewing and launching a campaign for an advertising application.

FIG. 19 illustrates a display screen providing a user interface for reviewing and launching a campaign for an advertising application.

Figure 20:
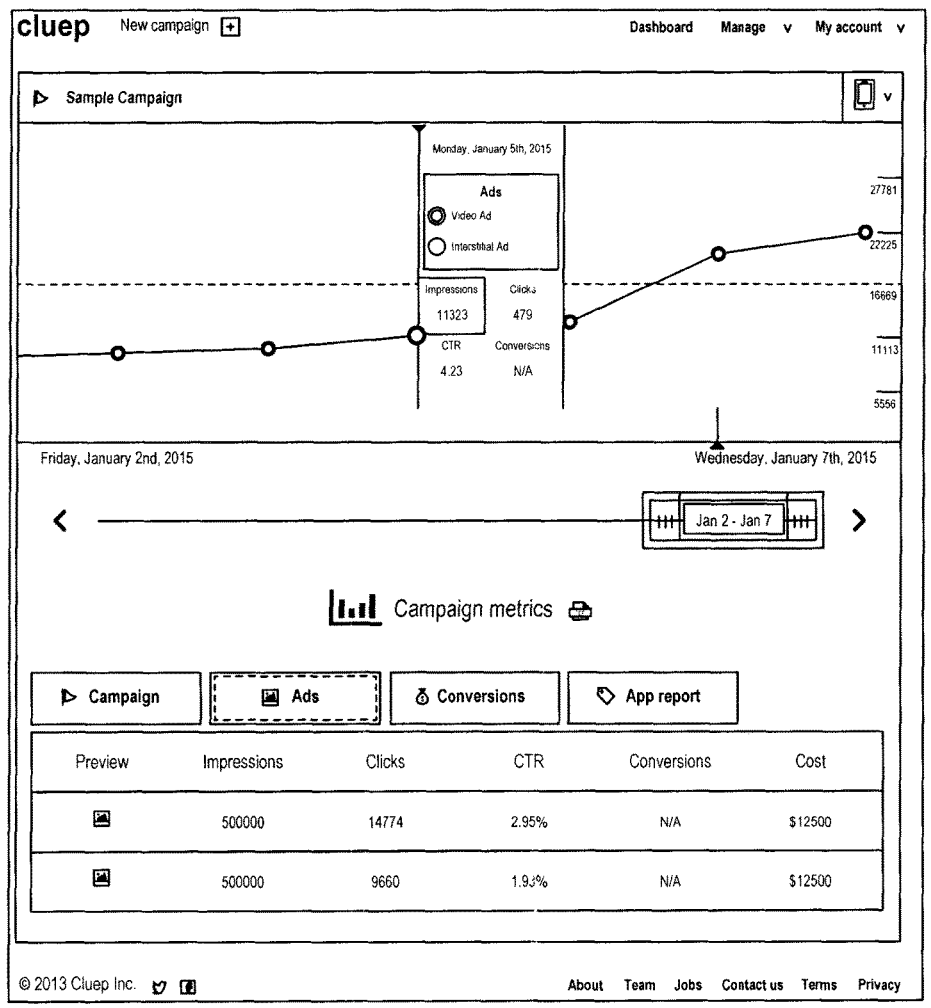
FIGS. 20 and 21 illustrate a display screen providing another user interface for a campaign dashboard for an advertising application.
Figure 21:
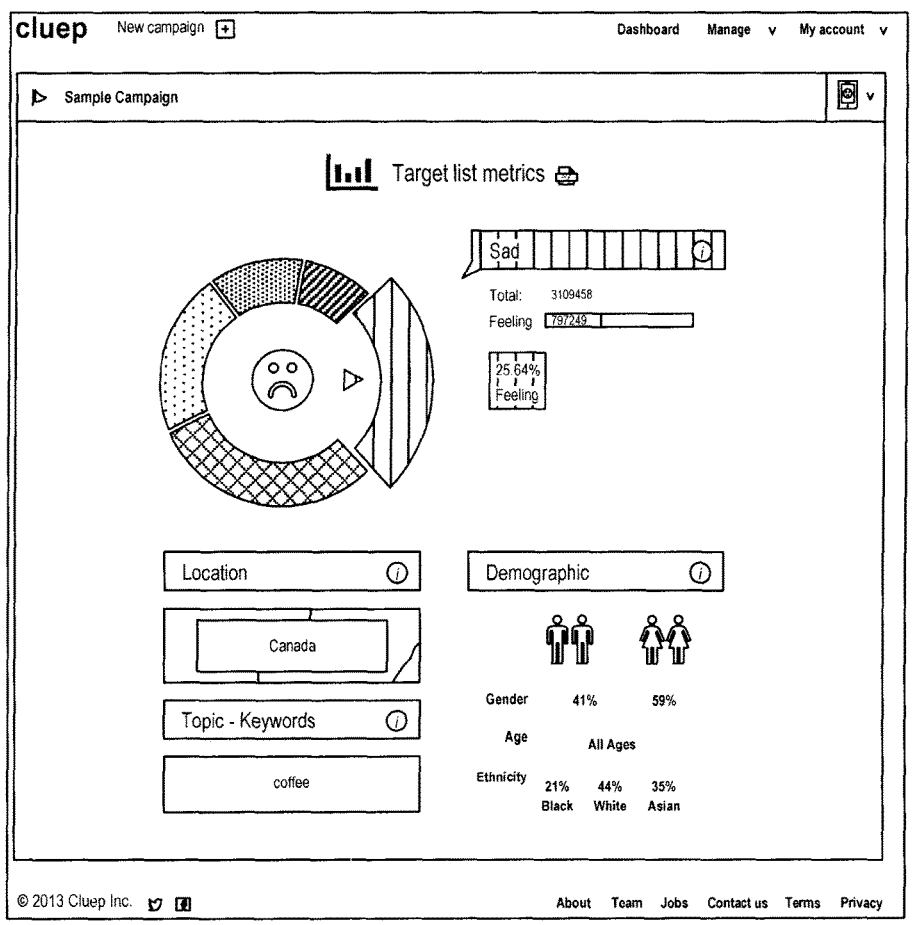

FIGS. 20 and 21 illustrate a display screen providing another user interface for a campaign dashboard for an advertising application including different campaign metrics.

The user interface may provide a listing of different feeling (as stored in a data storage device) for selection. The selected feelings may be saved in association with the brand or campaign and used for the feeling analysis or classification. For example, "happy" may be selected to detect feeling from text associated with the brands (and detected via the keywords or filters) that may indicate happy feelings.

The user interface may display social media text from different users that may be flagged based on the keyword filters associated with the brand. This enables a user to review social media text linked to the brand or campaign.

Embodiments described herein may provide an application programming interface to send text to and receive annotated text in response as a feeling (happy, loved, excited, hopeful, scared, sad, horrible, angry, or neutral) and topic (keyword or category).

In further aspects, the embodiments described herein provide systems, devices, methods, and computer programming products, including non-transient machine-readable instruction sets, for use in implementing such methods and enabling the functionality described previously.

Although the disclosure has been described and illustrated in exemplary forms with a certain degree of particularity, it is noted that the description and illustrations have been made by way of example only. Numerous changes in the details of construction and combination and arrangement of parts and steps may be made. Accordingly, such changes are intended to be included in the invention, the scope of which is defined by the claims.

Except to the extent explicitly stated or inherent within the processes described, including any optional steps or components thereof, no required order, sequence, or combination is intended or implied. As will be will be understood by those skilled in the relevant arts, with respect to both processes and any systems, devices, etc., described herein, a wide range of variations is possible, and even advantageous, in various circumstances.

The embodiments of the systems and methods described herein may be implemented in hardware or software, or a combination of both. These embodiments may be implemented in computer programs executing on programmable computers, each computer including at least one processor, a data storage system (including volatile memory or non-volatile memory or other data storage elements or a combination thereof), and at least one communication interface. For example, and without limitation, the various programmable computers may be a server, network appliance, set-top box, embedded device, computer expansion module, personal computer, laptop, personal data assistant, cellular telephone, smartphone device, UMPC tablets and wireless hypermedia device or any other computing device capable of being configured to carry out the methods described herein.

Program code is applied to input data to perform the functions described herein and to generate output information. The output information is applied to one or more output devices, in known fashion. In some embodiments, the communication interface may be a network communication interface. In embodiments in which elements of the invention are combined, the communication interface may be a software communication interface, such as those for inter-process communication. In still other embodiments, there may be a combination of communication interfaces implemented as hardware, software, and combination thereof.

Each program may be implemented in a high level procedural or object oriented programming or scripting language, or a combination thereof, to communicate with a computer system. However, alternatively the programs may be implemented in assembly or machine language, if desired. The language may be a compiled or interpreted language. Each such computer program may be stored on a storage media or a device (e.g., ROM, magnetic disk, optical disc), readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the systems and methods of the described embodiments are capable of being distributed in a computer program product including a physical, non-transitory computer readable medium that bears computer usable instructions for one or more processors. The medium may be provided in various forms, including one or more diskettes, compact disks, tapes, chips, magnetic and electronic storage media, volatile memory, non-volatile memory and the like. Non-transitory computer-readable media may include all computer-readable media, with the exception being a transitory, propagating signal. The term non-transitory is not intended to exclude computer readable media such as primary memory, volatile memory, RAM and so on, where the data stored thereon may only be temporarily stored. The computer useable instructions may also be in various forms, including compiled and non-compiled code.

Throughout the following discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions. One should further appreciate the disclosed computer-based algorithms, processes, methods, or other types of instruction sets can be embodied as a computer program product comprising a non-transitory, tangible computer readable media storing the instructions that cause a processor to execute the disclosed steps. One should appreciate that the systems and methods described herein may dynamically configure network security devices to deny or permit network access between those devices and network resources, as described herein.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

In further aspects, the disclosure provides systems, devices, methods, and computer programming products, including non-transient machine-readable instruction sets, for use in implementing such methods and enabling the functionality described previously.

Although the disclosure has been described and illustrated in exemplary forms with a certain degree of particularity, it is noted that the description and illustrations have been made by way of example only. Numerous changes in the details of construction and combination and arrangement of parts and steps may be made. Accordingly, such changes are intended to be included in the invention, the scope of which is defined by the claims.

Except to the extent explicitly stated or inherent within the processes described, including any optional steps or components thereof, no required order, sequence, or combination is intended or implied. As will be will be understood by those skilled in the relevant arts, with respect to both processes and any systems, devices, etc., described herein, a wide range of variations is possible, and even advantageous, in various circumstances, without departing from the scope of the invention, which is to be limited only by the claims.

What is claimed is:

1. A system comprising:
    at least one client computing device executing an application to transmit a set of text data elements as a feeling classification request;
    at least one computer processor in communication with the at least one computing device over a communications network to receive the feeling classification request, and in response, transmit a feeling classification response, the computer processor configuring a text analysis engine, a reverse sentence reconstruct (RSR) utility for determining grammatical and semantic structure of the set of text data elements, and a sentence vectorization technique (SVT) utility to generate SVT models, wherein the computer processor is configured to compute the feeling classification response using the RSR utility and SVT utility, wherein the RSR utility interacts with the SVT utility to provide a parsing component to generate a syntactic text tree with parts-of-speech for the text data elements and a classification component to classify feeling of the text data elements for the feeling classification response; and
    at least one data storage device storing the SVT models, a labelled text corpus and a slang and spelling dictionary.

2. The system of claim 1, further comprising a pre-processor utility to implement pre-processing on the text data elements using at least one of a multiple language processor, a slang dictionary matcher, a textual spelling adjuster, and a textual normalizer processor to output a textual string.

3. The system of claim 1, wherein the parsing component is configured to:
    for each word of the text data elements, obtain a word vector from a parsing SVT model of the SVT utility;
    for each word vector:
        calculate, using a parsing combination matrix and a parsing probability vector, a probability of how well the word vector combines with neighbouring word vectors; and
        generate a phrase vector from the parsing combination matrix by combining the word vector with the neighbouring word vector with the highest probability;
    wherein the calculation and generation are repeated by treating each new phrase vector as a word vector to generate syntactic text tree of nodes representing a word or phrase vector;
    compute a part-of-speech matrix;
    for each node in the syntactic text tree:
        calculate a confidence score using the part-of-speech matrix, the confidence score providing a list of values representing a probability of how likely each part-of-speech can represent the word or phrase vector at the node;
        assign a part-of-speech to the node based on the highest probability in the confidence score
    determine whether the confidence score is higher than a threshold; and
    output a syntactic text tree with each node labeled with its corresponding part-of-speech.

4. The system of claim 3, wherein the parsing component is configured to execute pre-training and training to obtain a parsing SVT model.

5. The system of claim 4, wherein the parsing component is configured to, as pre-training, obtain the labelled text corpus, generate word vectors, generate phrase vectors, generate a parsing combination matrix, generate a parsing probability vector, and generate a part-of-speech matrix to output a randomized parsing SVT model.

6. The system of claim 5, wherein the parsing component is configured to, as training, obtain the randomized parsing SVT model, calculate an error rate, generate a derivative vector, adjust the error rate and the derivative vector, determine that the error rate is not minimized, and generate a parsing SVT model.

7. The system of claim 4, wherein the parsing component is configured to, as enhancement, obtain the syntactic text tree, store and re-label the syntactic text tree and update the labelled text corpus.

8. The system of claim 1, wherein the classification component is configured to:
    for each word of the text data elements, obtain a word vector from a feeling SVT model of the SVT utility;
    for each word vector, compute a feeling matrix, and obtain a word vector from the feeling matrix;
    obtain a confidence score; and
    determine whether the confidence score is higher than a threshold to output a text string with associated feeling.

9. The system of claim 8, wherein the classification component is configured to execute pre-training and execute training to obtain a feeling SVT model.

10. The system of claim 9, wherein the classification component is configured to, as pre-training, obtained labelled text corpus, generate word vectors, generate phrase vectors, generate a feeling combination matrix, generate a feeling probability vector, to output a randomized feeling SVT model.

11. The system of claim 9, wherein the classification component is configured to, as training, obtain the randomized feeling SVT model, calculate the error rate, generate a derivative vector, adjust error rate and derivative vector, determine that the error rate is not minimized, generate a feeling SVT model.

12. The system of claim 9, wherein the parsing component is configured to, as enhancement, obtain syntactic text tree, and store and re-label the syntactic text tree update parsing text corpus.

13. A computer device comprising:
    at least one data storage component;
    at least one receiver in communication with an application on at least one client computing device over a communications network to receive a set of text data elements as a feeling classification request;
    at least one processor configured to provide a reverse sentence reconstruct (RSR) utility for determining grammatical and semantic structure of the set of text data elements, and a sentence vectorization technique (SVT) utility to generate SVT models;

at least one transmitter to transmit classified feeling data to the application on the at least one client computing device as a feeling classification response; and wherein the at least one processor is configured with control logic to transform the feeling classification request into the feeling classification response using the RSR utility and SVT utility, wherein the RSR utility interacts with the SVT utility to provide a parsing component to parse the text data elements and a classification component to classify feeling of the text data elements for the feeling classification response.

14. A method comprising:

receiving a feeling classification request from an application executing on a client device, feeling classification request comprising text data elements;

in response, generating and transmitting a feeling classification response by:

determining grammatical and semantic structure of the set of text data elements using a reverse sentence reconstruct (RSR) utility;

generating sentence vectorization technique (SVT) models using a SVT utility;

storing the SVT models, a labelled text corpus and a slang and spelling dictionary;

generating a syntactic text tree with the text data elements using a parsing component of the RSR utility; and classifying feeling of the text data elements in the syntactic text tree using a classification component of the RSR utility.

15. The method of claim 14, further comprising pre-processing the text data elements using at least one of a multiple language processor, a slang dictionary matcher, a textual spelling adjuster, and a textual normalizer processor.

16. The method of claim 14, further comprising:

for each word of the text data elements, obtaining a word vector from a parsing SVT model of the SVT utility;

for each word vector:

calculating, using a parsing combination matrix and a parsing probability vector, a probability of how well the word vector combines with neighbouring word vectors; and generating a phrase vector from the parsing combination matrix by combining the word vector with the neighbouring word vector with the highest probability;

wherein the calculation and generation are repeated by treating each new phrase vector as a word vector to generate syntactic text tree of nodes representing a word or phrase vector;

computing a part-of-speech matrix;

for each node in the syntactic text tree:

calculating a confidence score using the part-of-speech matrix, the confidence score providing a list of values representing a probability of how likely each part-of-speech can represent the word or phrase vector at the node;

assigning a part-of-speech to the node based on the highest probability in the confidence score determining whether the confidence score is higher than a threshold; and outputting a syntactic text tree syntactic text tree with each node labeled with its corresponding part-of-speech.

17. The method of claim 14, further comprising pre-training and training to obtain a parsing SVT model.

18. The method of claim 14, further comprising, as pre-training, obtaining the labelled text corpus, generating word vectors, generating phrase vectors, generating a parsing combination matrix, generating a parsing probability vector, and generating a part-of-speech matrix to output a randomized parsing SVT model.

19. The method of claim 14, further comprising, as training, obtaining the randomized parsing SVT model, calculating an error rate, generating a derivative vector, adjusting the error rate and the derivative vector, determining that the error rate is not minimized, and generating a parsing SVT model.

20. The method of claim 14, further comprising, as enhancement, obtaining the syntactic text tree, storing and re-labeling the syntactic text tree and updating the labelled text corpus.

21. The method of claim 14, further comprising:

for each word of the text data elements, obtaining a word vector from a feeling SVT model of the SVT utility;

for each word vector, computing a feeling matrix, and obtain a word vector from the feeling matrix;

obtaining a confidence score; and determining whether the confidence score is higher than a threshold to output a text string with associated feeling.

22. The method of claim 21, further comprising pre-training and execute training to obtain a feeling SVT model.

23. The method of claim 21, further comprising, as pre-training, obtaining labelled text corpus, generating word vectors, generating phrase vectors, generating a feeling combination matrix, generating a feeling probability vector, to output a randomized feeling SVT model.

24. The method of claim 21, further comprising, as training, obtaining the randomized feeling SVT model, calculating the error rate, generating a derivative vector, adjusting error rate and derivative vector, determining that the error rate is not minimized, generating a feeling SVT model.

25. The method of claim 21, further comprising, as enhancement, obtaining syntactic text tree, and storing and re-labeling the syntactic text tree to update parsing text corpus.

* * * * *